United States Patent
Lee et al.

(10) Patent No.: US 10,447,438 B2
(45) Date of Patent: Oct. 15, 2019

(54) METHOD FOR TRANSMITTING AND RECEIVING DOWNLINK DATA IN WIRELESS COMMUNICATION SYSTEM, AND APPARATUS THEREFOR

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Ilmu Byun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/753,870

(22) PCT Filed: Dec. 28, 2015

(86) PCT No.: PCT/KR2015/014353
§ 371 (c)(1),
(2) Date: Feb. 20, 2018

(87) PCT Pub. No.: WO2017/034096
PCT Pub. Date: Mar. 2, 2017

(65) Prior Publication Data
US 2019/0074936 A1     Mar. 7, 2019

Related U.S. Application Data

(60) Provisional application No. 62/207,934, filed on Aug. 21, 2015.

(51) Int. Cl.
*H04L 1/18* (2006.01)
*H04W 76/28* (2018.01)
(Continued)

(52) U.S. Cl.
CPC .......... *H04L 1/1819* (2013.01); *H04L 1/0061* (2013.01); *H04L 1/18* (2013.01);
(Continued)

(58) Field of Classification Search
CPC ... H04L 1/0061; H04L 1/1819; H04L 5/0048; H04L 5/0055; H04L 5/0057;
(Continued)

(56) References Cited

U.S. PATENT DOCUMENTS

2010/0081443 A1* 4/2010 Meyer ............... H04L 1/1812
455/450
2010/0189032 A1* 7/2010 Chen ................... H04B 1/7143
370/328

(Continued)

*Primary Examiner* — Gary Mui
(74) *Attorney, Agent, or Firm* — Birch, Stewart, Kolasch & Birch, LLP

(57) ABSTRACT

A method for transmitting and receiving downlink (DL) data performed by a user equipment (UE) in a wireless communication system according to the present disclosure includes receiving a first DL grant from a base station (BS); receiving first DL data based on the first DL grant from the BS; transmitting a HARQ response in response to the first DL data to the BS; and receiving one or more second DL data from the BS, and a specific frequency shift pattern is set in a frequency region between a resource in which the second DL data is received and a resource in which the first DL data is received, or between resources in which the second DL data are received.

20 Claims, 31 Drawing Sheets

(51) Int. Cl.

| | |
|---|---|
| *H04W 76/11* | (2018.01) |
| *H04W 76/27* | (2018.01) |
| *H04L 1/00* | (2006.01) |
| *H04L 5/00* | (2006.01) |
| *H04W 72/14* | (2009.01) |
| *H04W 74/08* | (2009.01) |
| *H04W 80/02* | (2009.01) |
| *H04W 72/12* | (2009.01) |

(52) U.S. Cl.
CPC .......... *H04L 1/1887* (2013.01); *H04L 1/1896* (2013.01); *H04L 5/0048* (2013.01); *H04L 5/0055* (2013.01); *H04L 5/0057* (2013.01); *H04W 72/14* (2013.01); *H04W 74/0833* (2013.01); *H04W 76/11* (2018.02); *H04W 76/27* (2018.02); *H04W 76/28* (2018.02); *H04L 5/0007* (2013.01); *H04W 72/12* (2013.01); *H04W 80/02* (2013.01)

(58) Field of Classification Search
CPC ... H04L 74/0833; H04W 76/11; H04W 76/27; H04W 76/28
See application file for complete search history.

(56) References Cited

U.S. PATENT DOCUMENTS

| | | | |
|---|---|---|---|
| 2010/0284363 A1* | 11/2010 | Ahn | H04B 1/7143 370/330 |
| 2011/0116457 A1* | 5/2011 | Damnjanovic | H04L 1/1854 370/329 |
| 2012/0002616 A1* | 1/2012 | Ishii | H04B 1/713 370/329 |
| 2012/0327783 A1 | 12/2012 | Moon et al. | |
| 2014/0153519 A1 | 6/2014 | Wengerter et al. | |
| 2014/0211722 A1 | 7/2014 | Pietraski et al. | |
| 2014/0376490 A1* | 12/2014 | McBeath | H04W 72/042 370/329 |
| 2015/0098490 A1 | 4/2015 | Ro et al. | |
| 2015/0271840 A1* | 9/2015 | Tavildar | H04L 1/08 370/329 |
| 2016/0072612 A1* | 3/2016 | Seo | H04L 1/1835 370/329 |
| 2016/0127106 A1* | 5/2016 | Nogami | H04L 5/0053 370/329 |
| 2016/0345299 A1* | 11/2016 | Suzuki | H04W 72/042 |
| 2017/0134935 A1* | 5/2017 | Wei | H04W 76/14 |
| 2017/0346607 A1* | 11/2017 | Chen | H04L 1/1896 |
| 2018/0035424 A1* | 2/2018 | Sun | H04B 1/713 |
| 2018/0139731 A1* | 5/2018 | Suzuki | H04L 1/1861 |
| 2018/0145798 A1* | 5/2018 | Suzuki | H04J 11/00 |
| 2018/0176903 A1* | 6/2018 | Lee | H04L 1/18 |

* cited by examiner

[Figure 1]
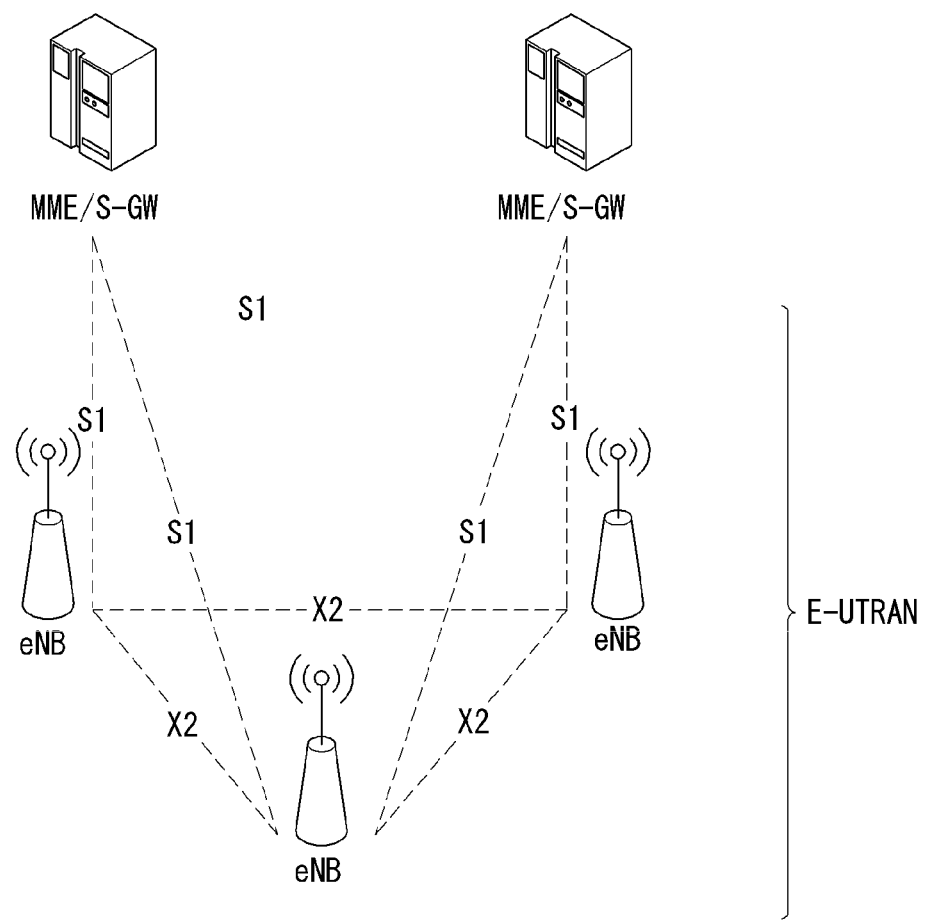

【Figure 2】
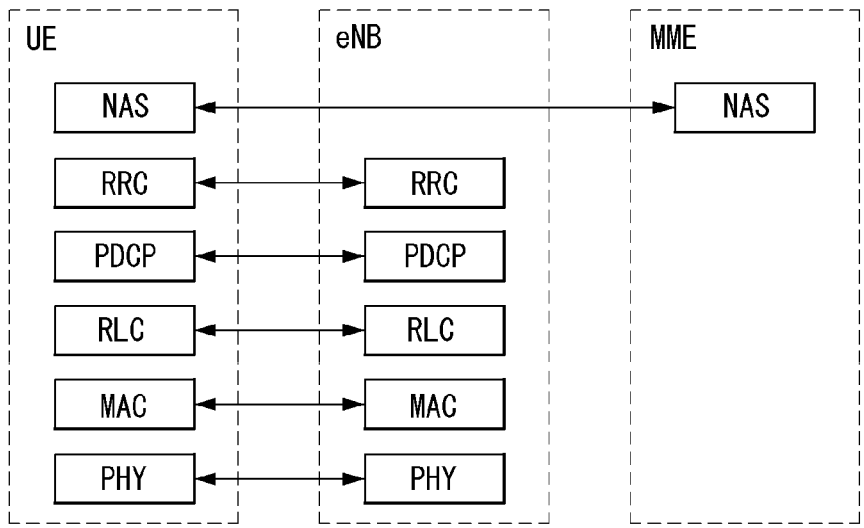
(a) Control plane protocol stack
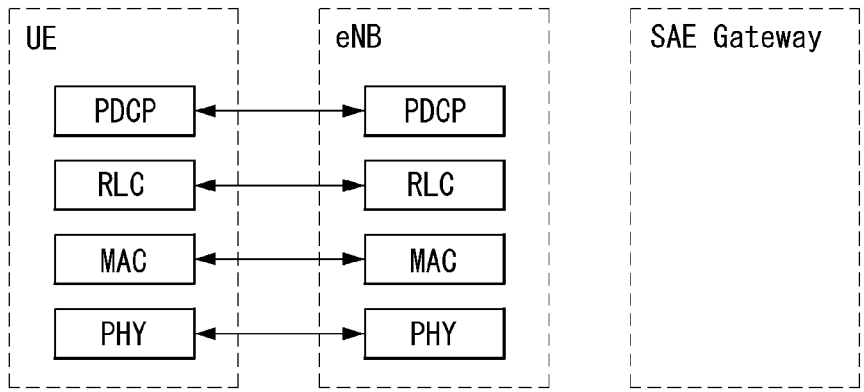
(b) User plane protocol stack

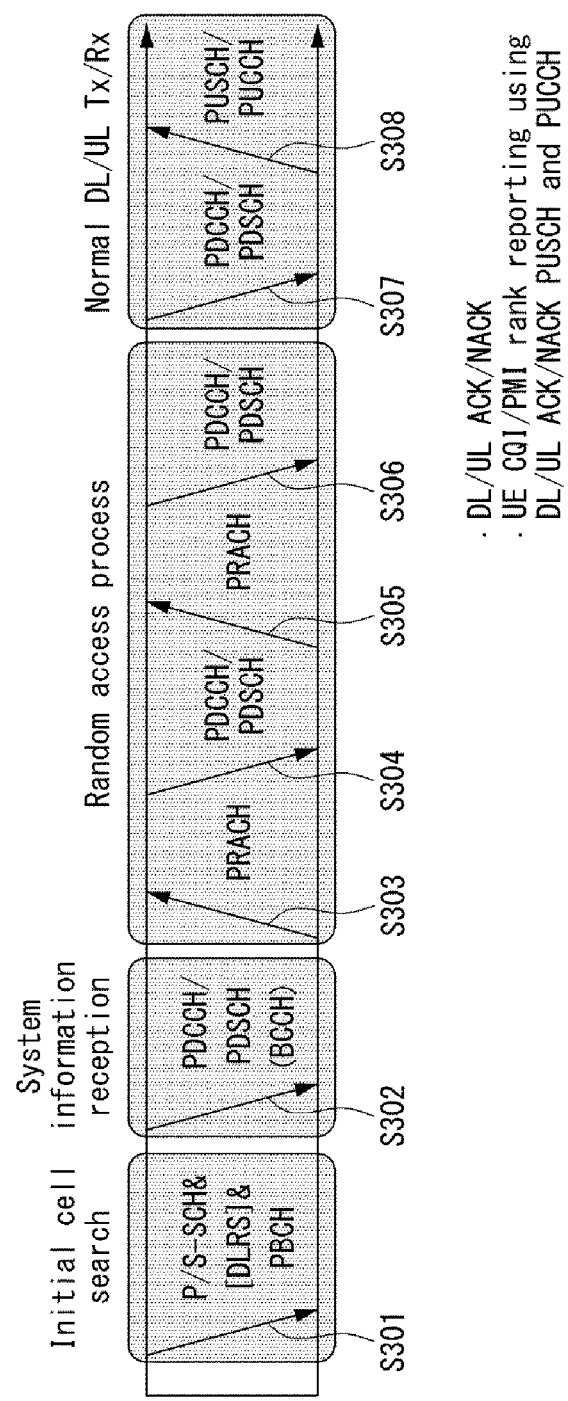
[Figure 3]

【Figure 4】
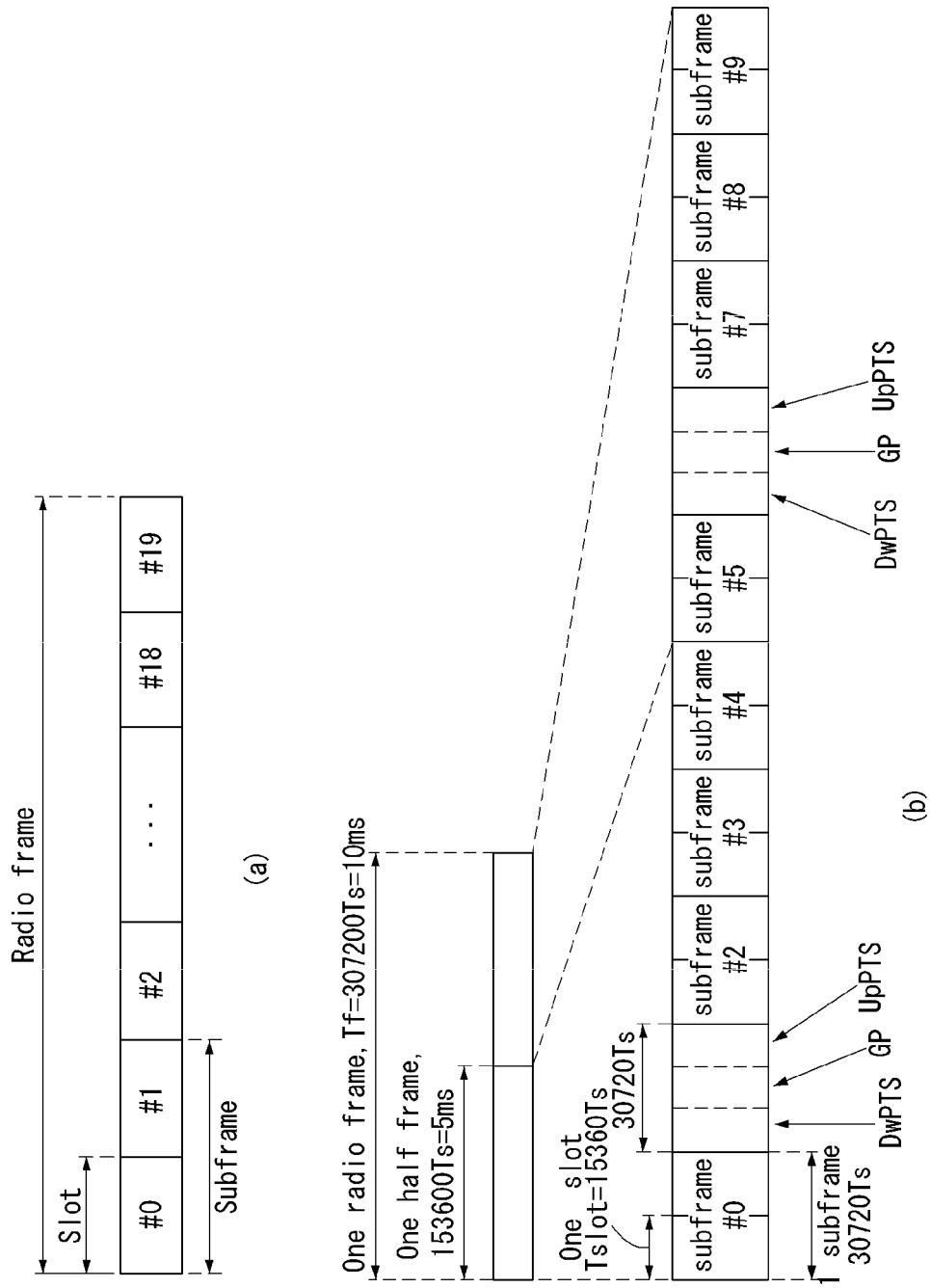

【Figure 5】
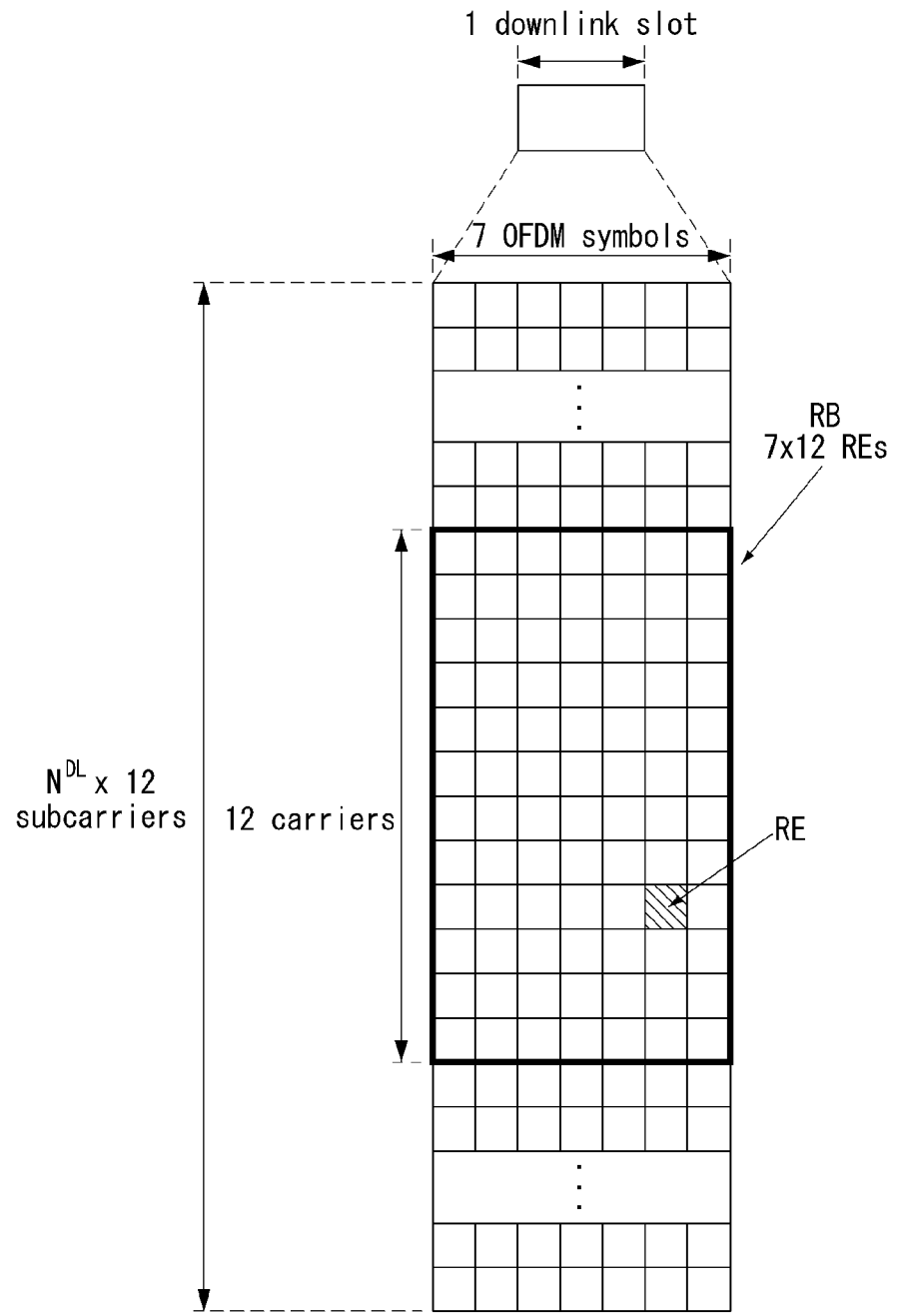

[Figure 6]
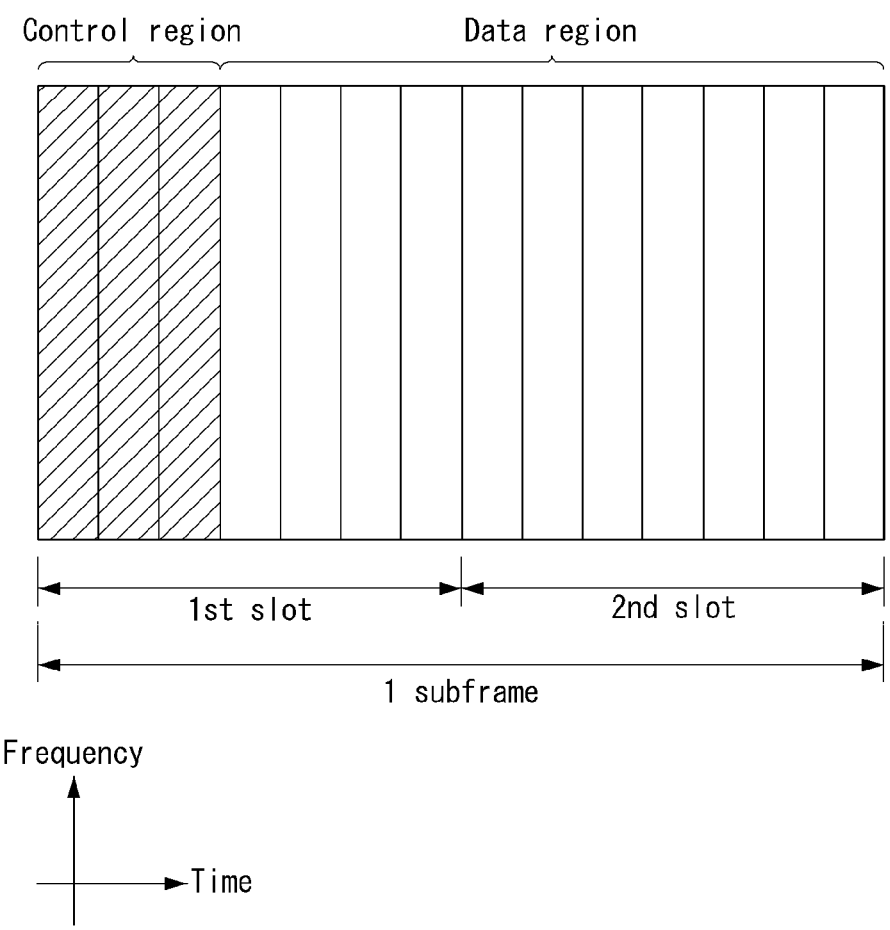

[Figure 7]
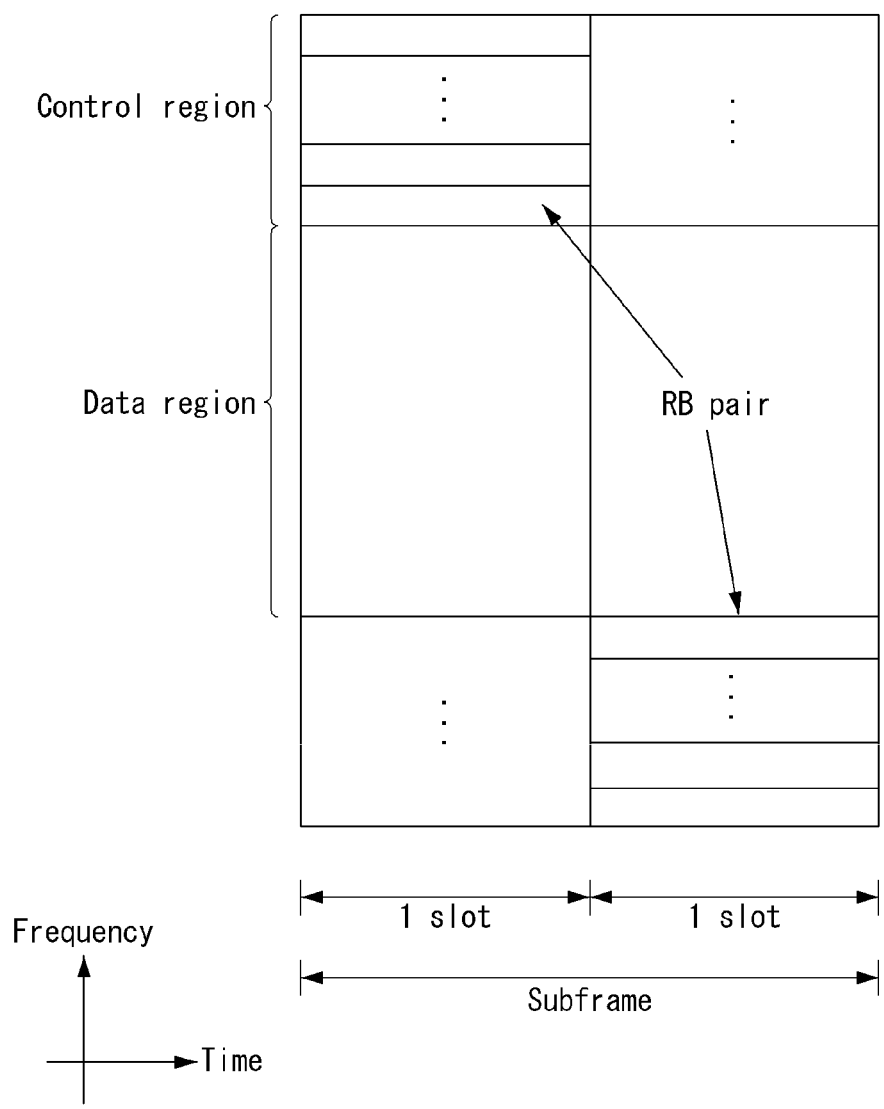

[Figure 8]
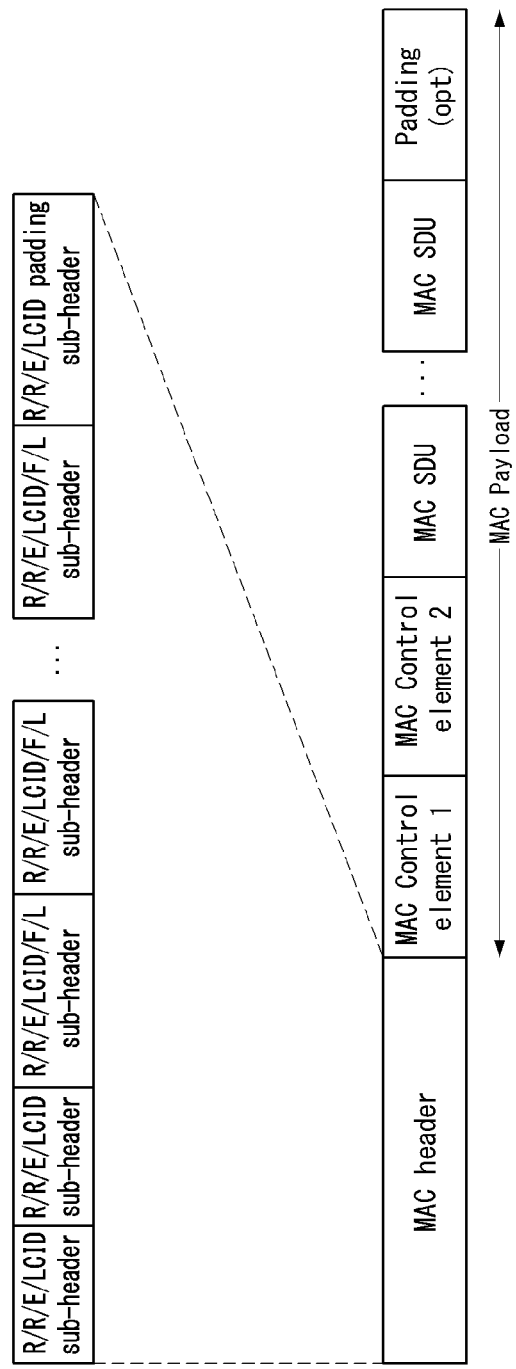

[Figure 9]
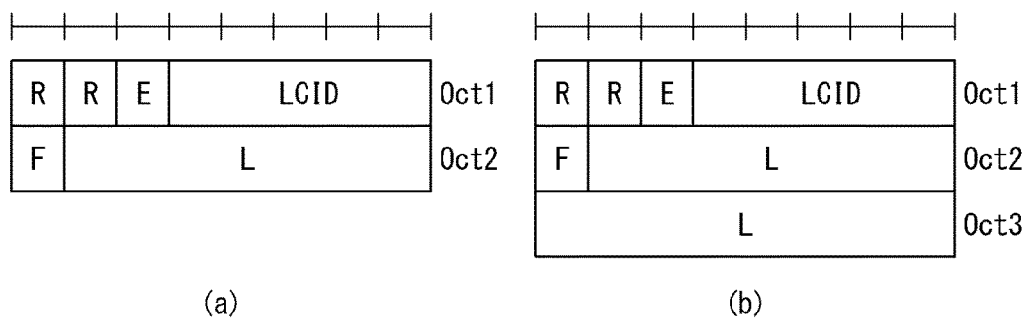
(a)　　　　　　　　　　　　(b)
[Figure 10]
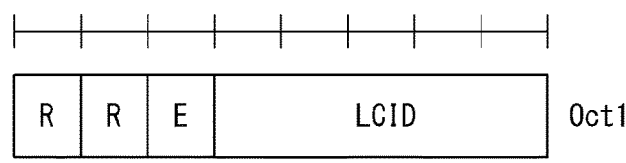
[Figure 11]
(a) 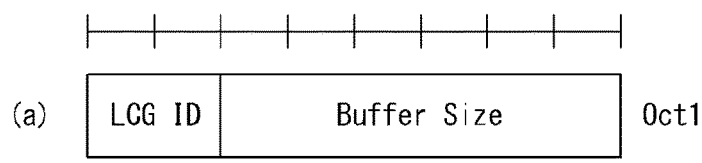
(b) 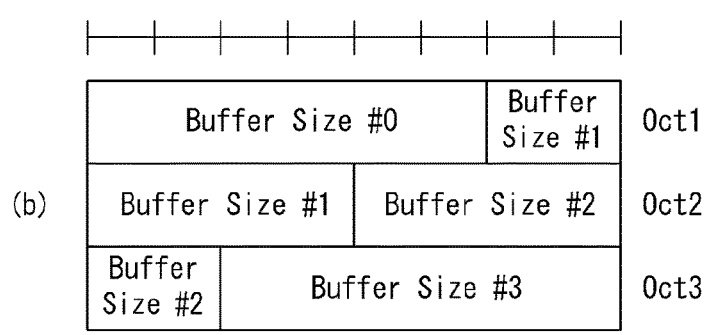

【Figure 12】
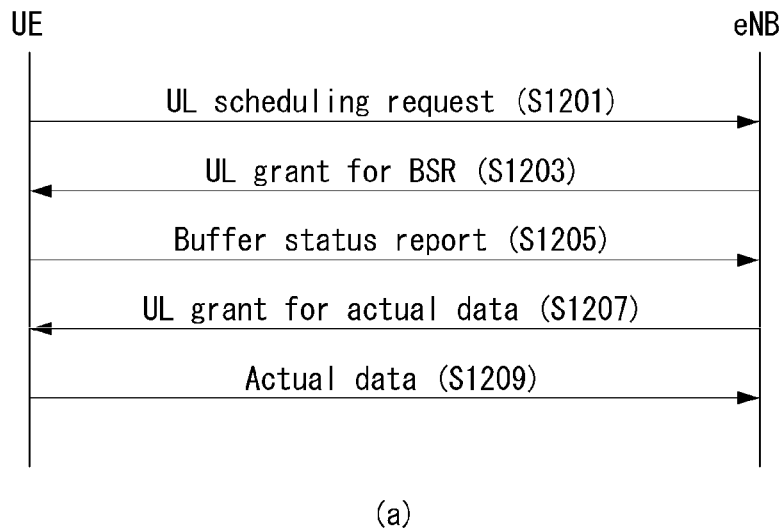
(a)
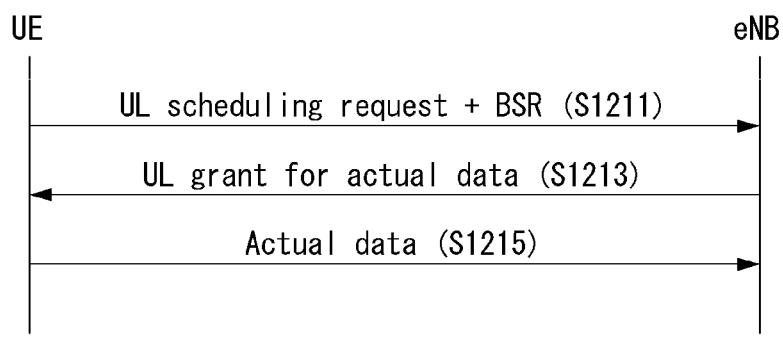
(b)

[Figure 13]
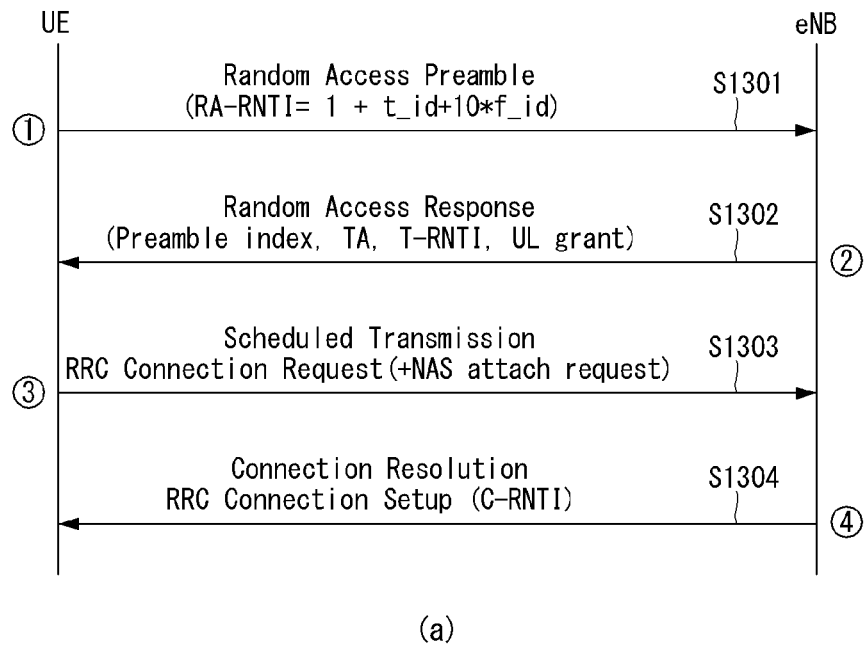
(a)
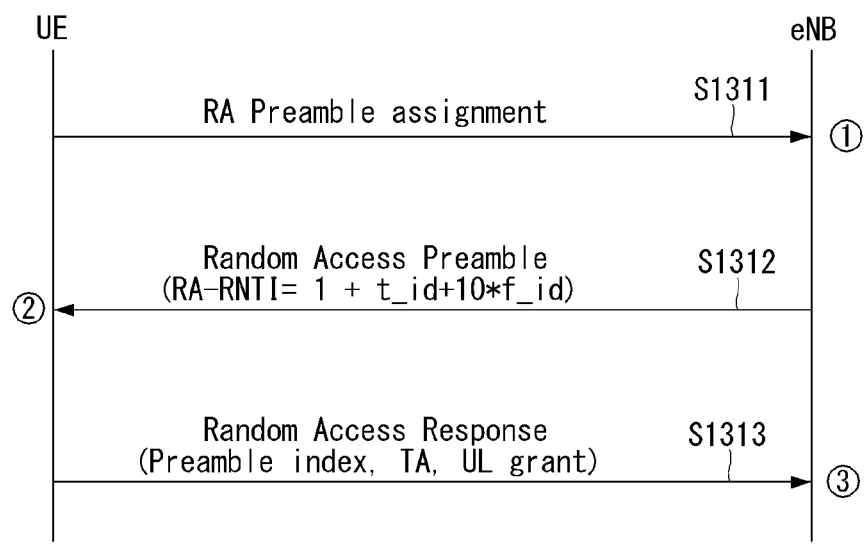
(b)

[Figure 14]
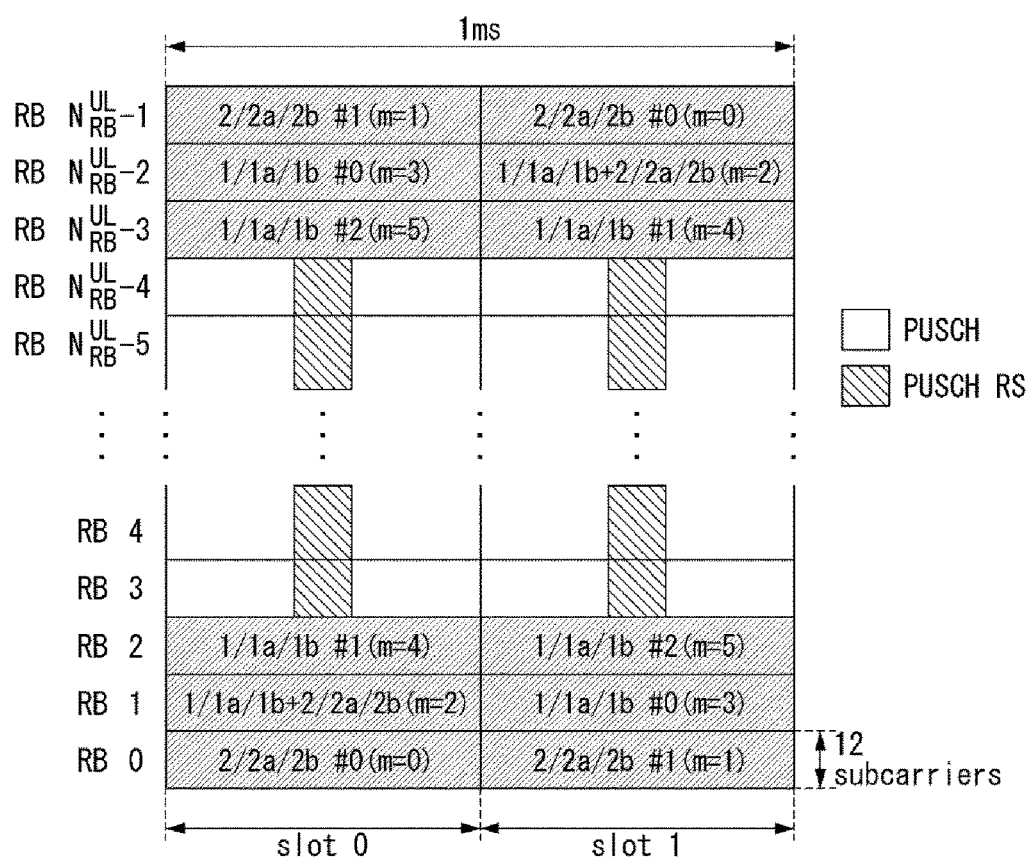

【Figure 15】
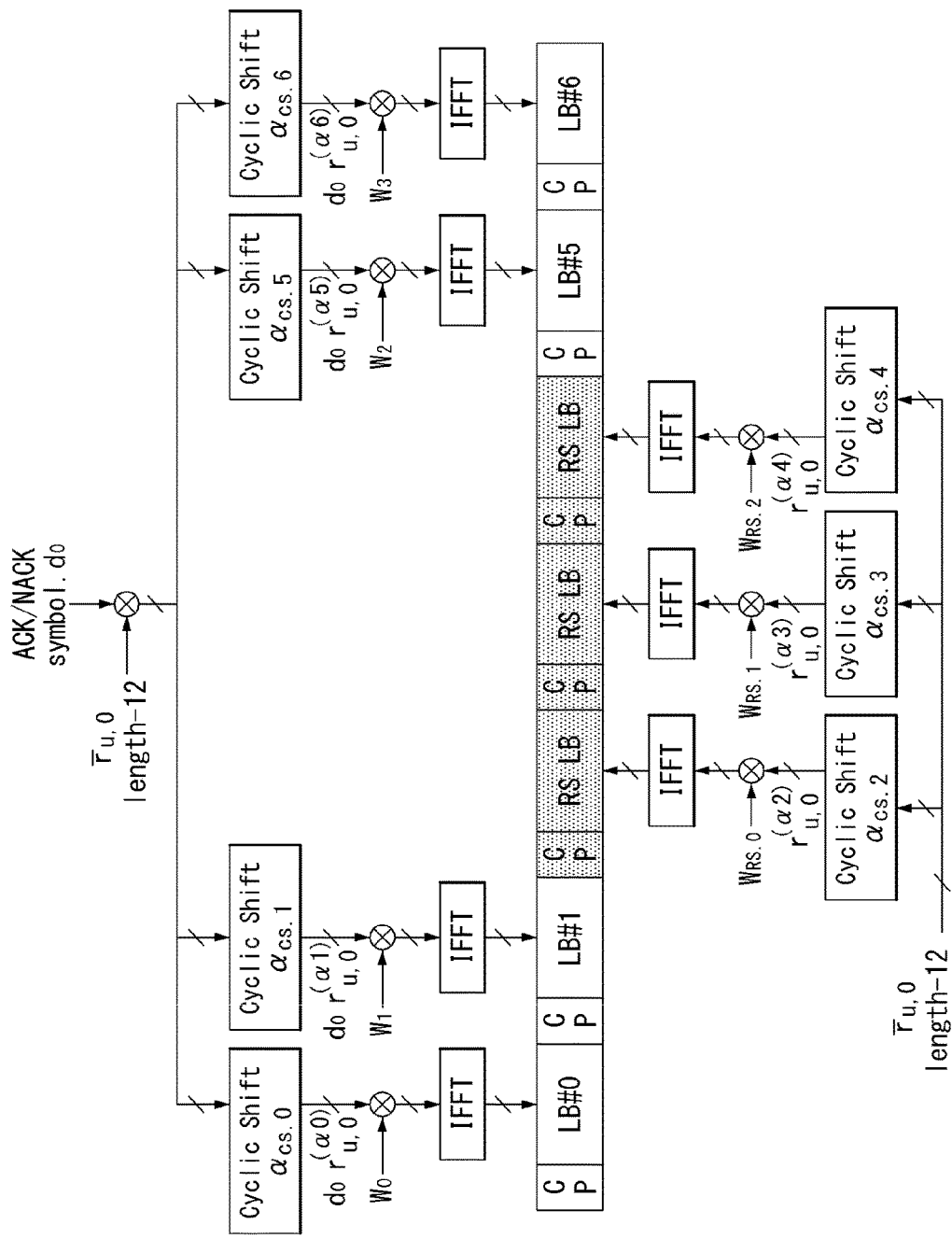

【Figure 16】
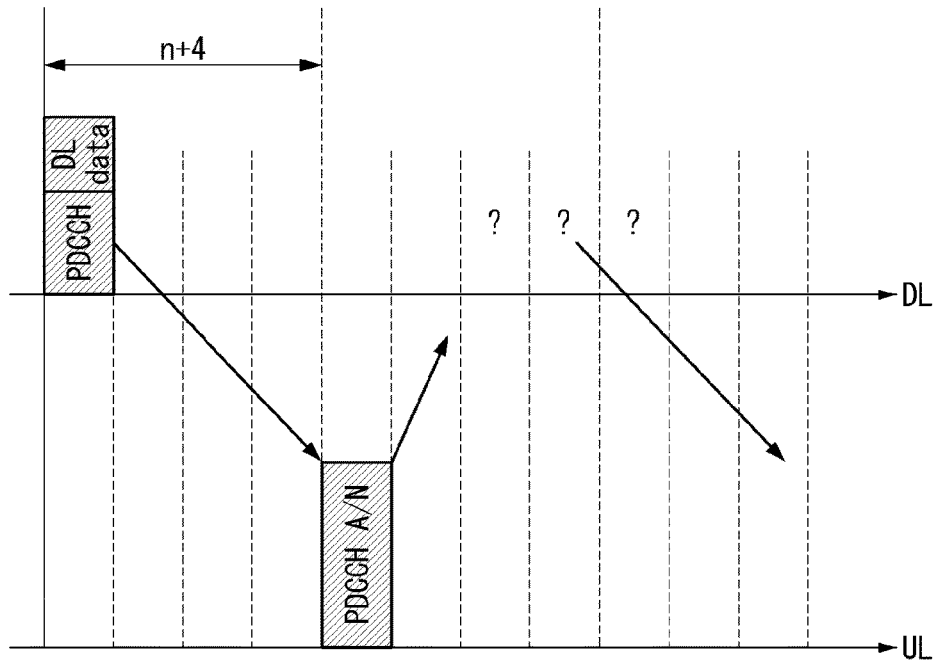
【Figure 17】
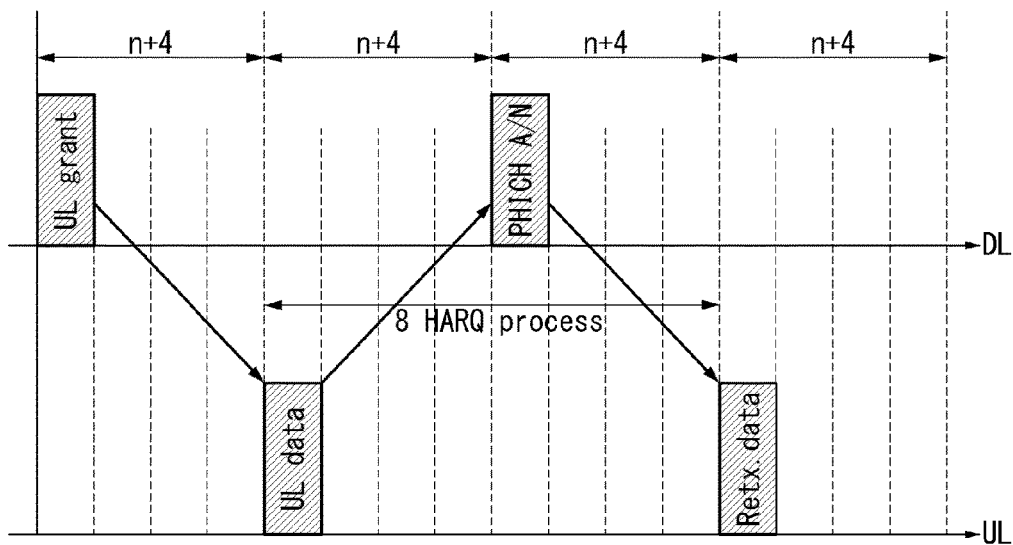

【Figure 18】
| 0/1A | FH | Resource block assignment | MCS/RV (5) | NDI | TPC (2) | DMRS CS (3) | UI (2) | DAI (2) | CQI req. |
【Figure 19】
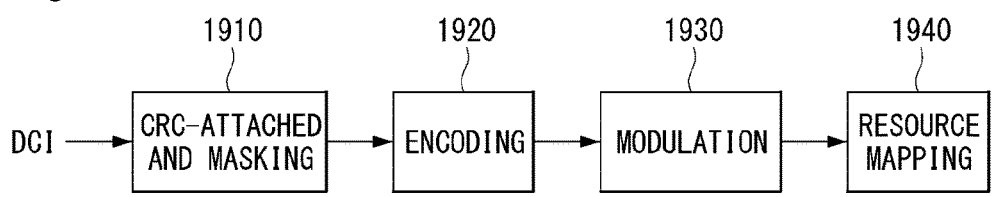

[Figure 20]
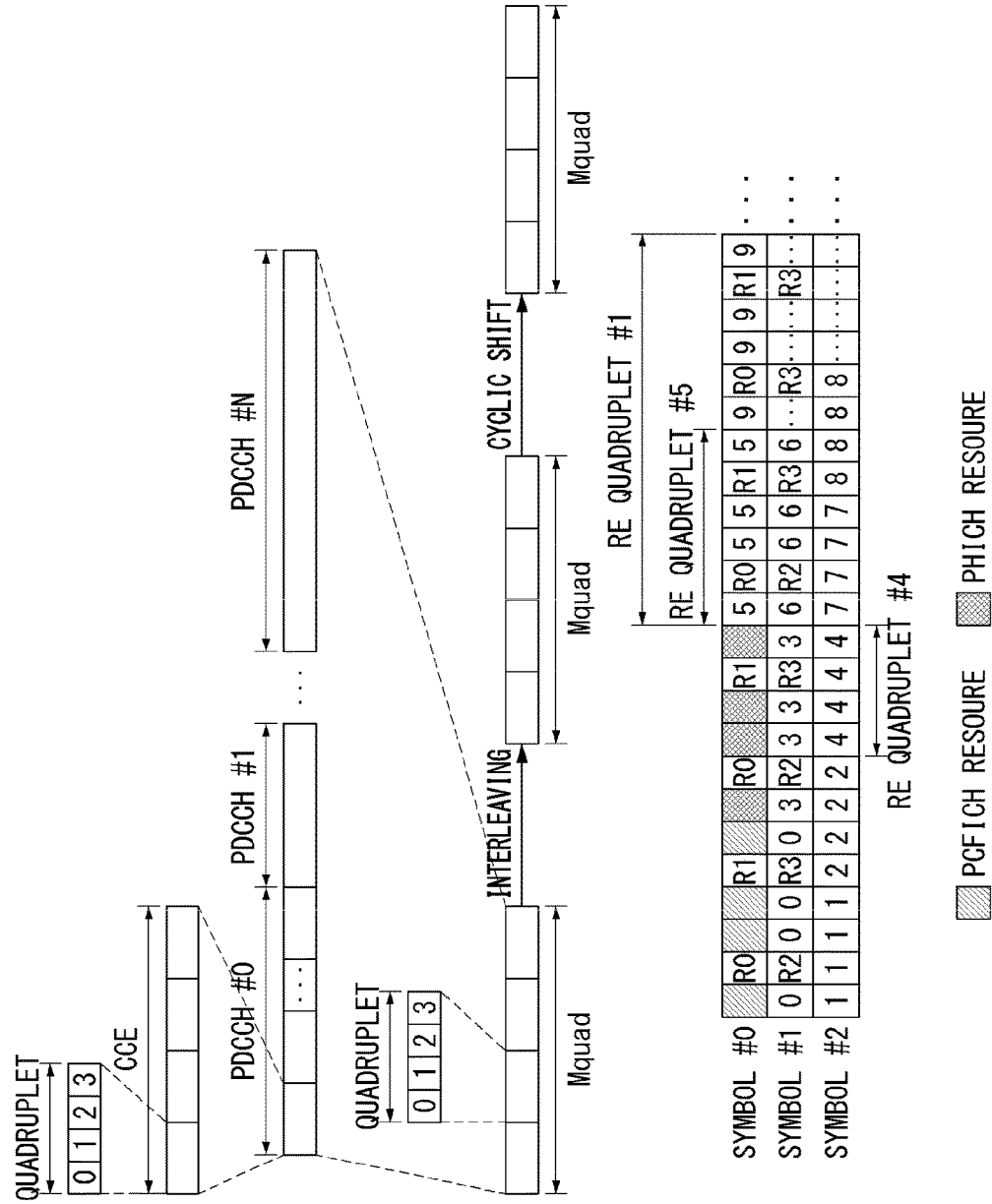

【Figure 21】
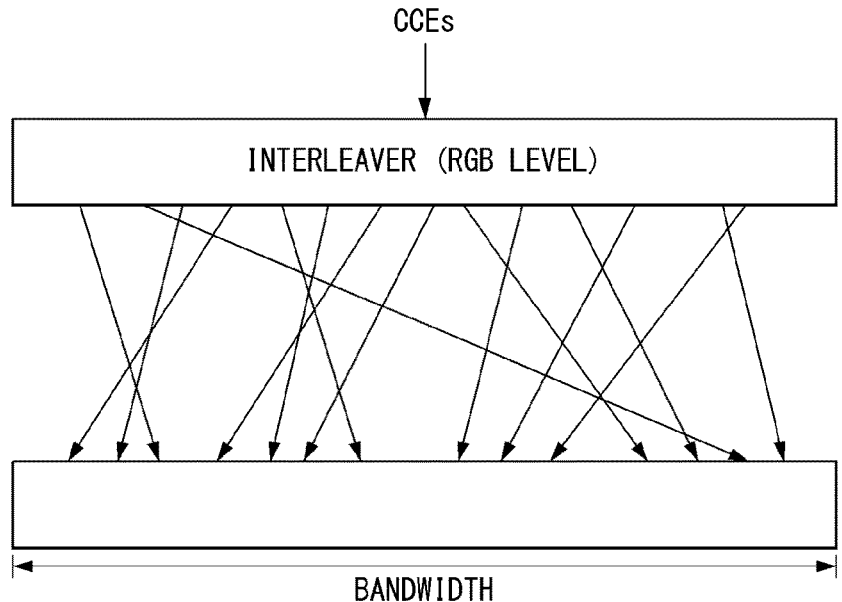
【Figure 22】
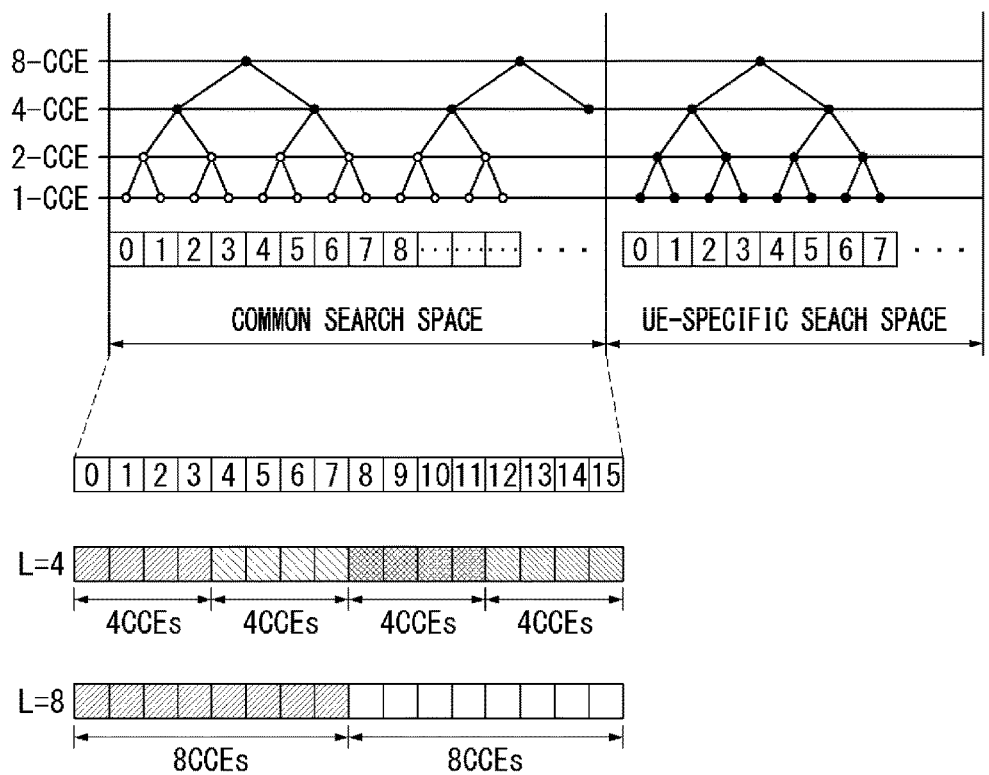

【Figure 23】
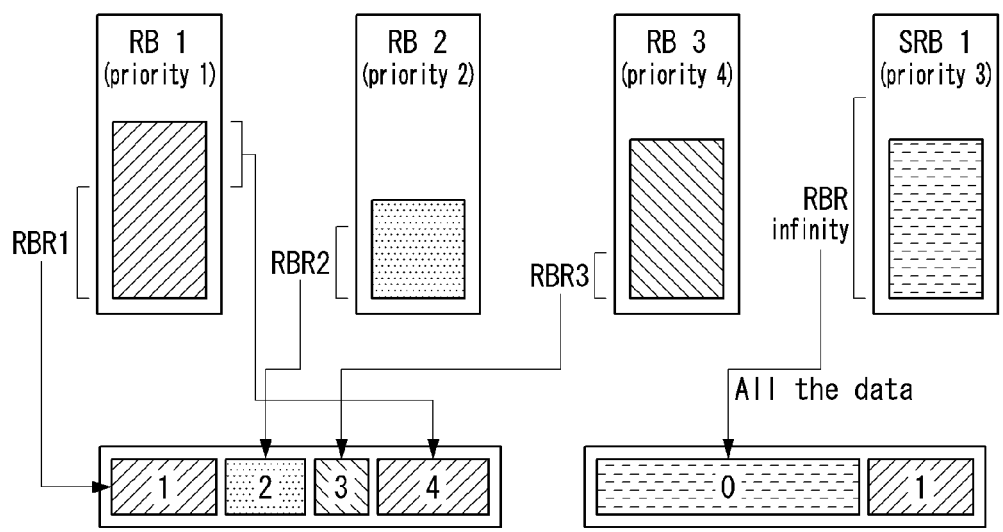

[Figure 24]
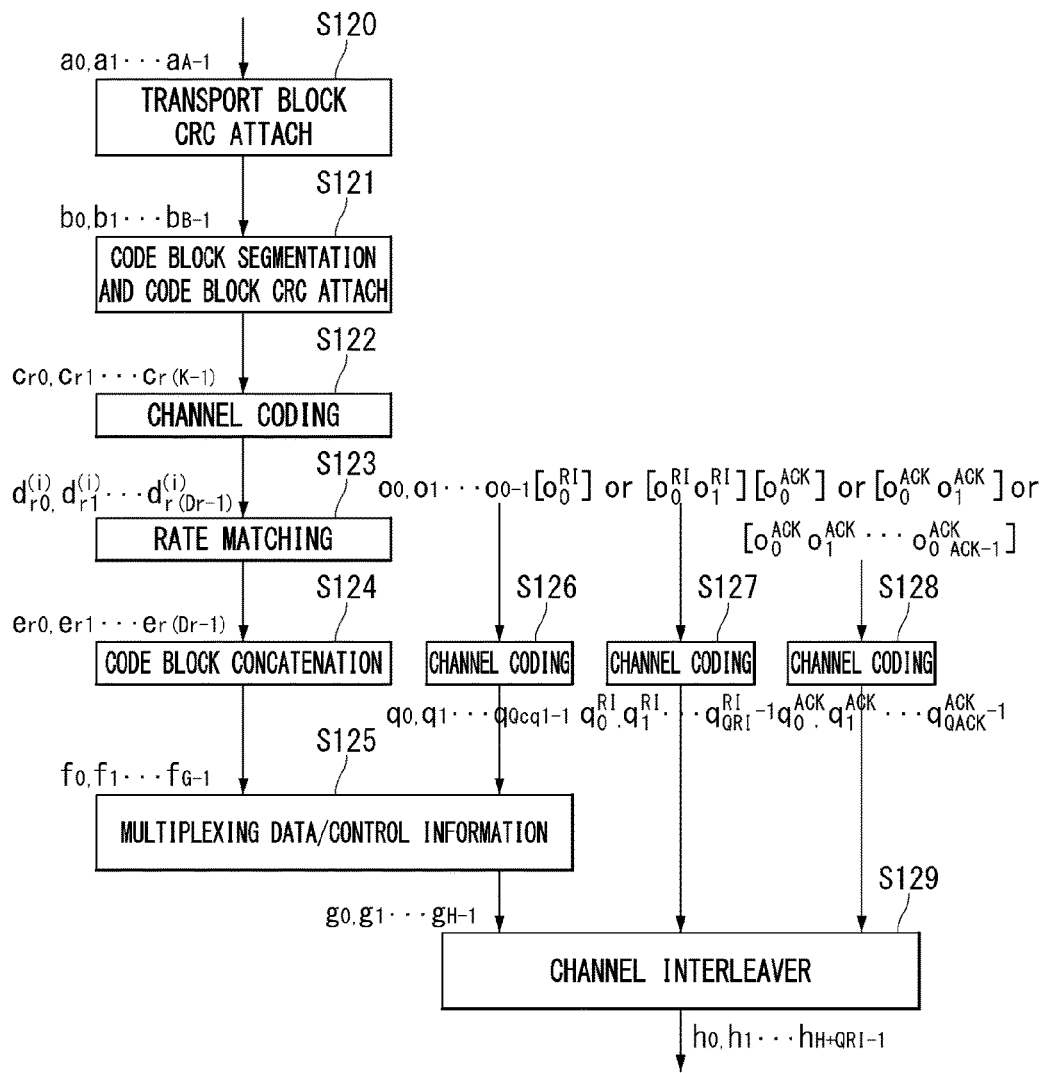

[Figure 25]
(a) 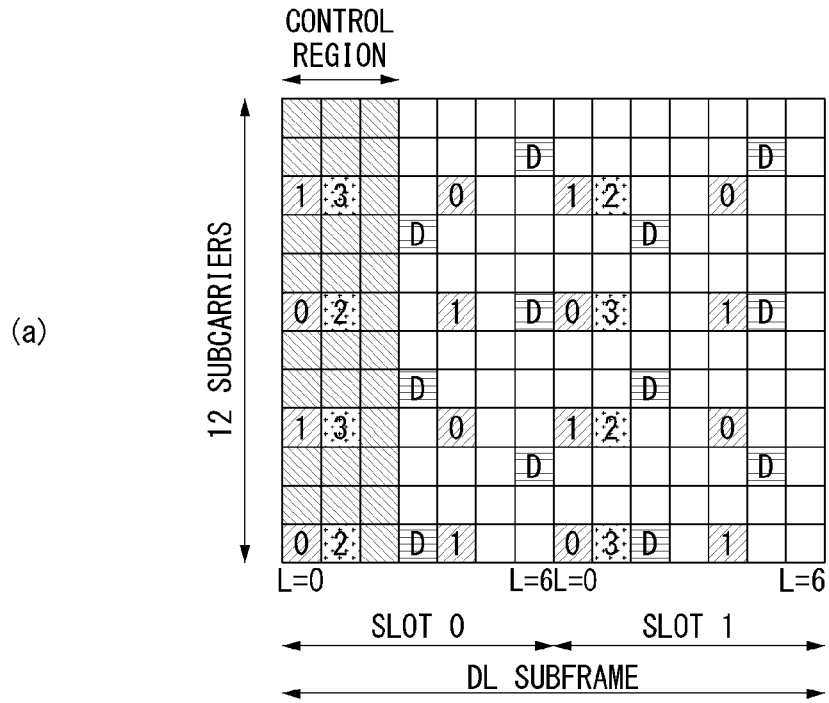
(b) 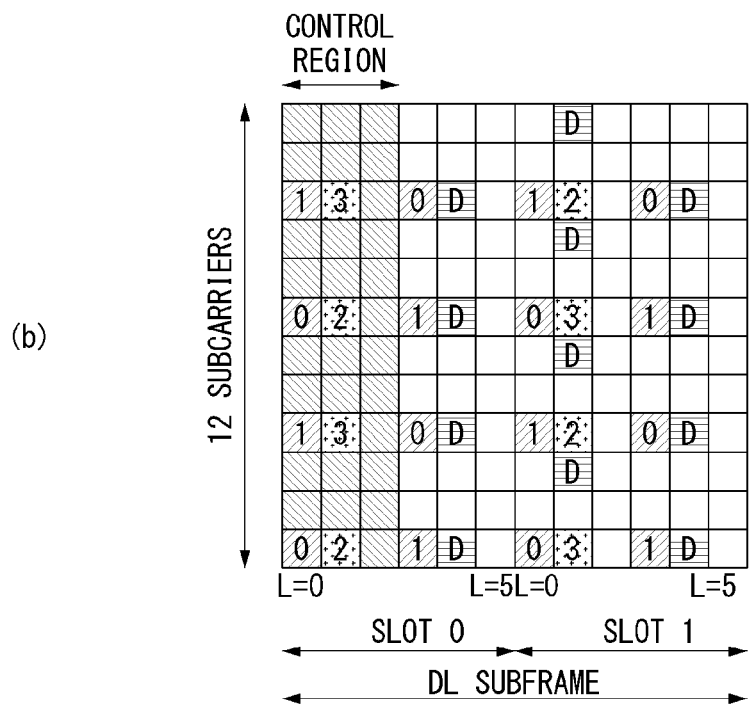

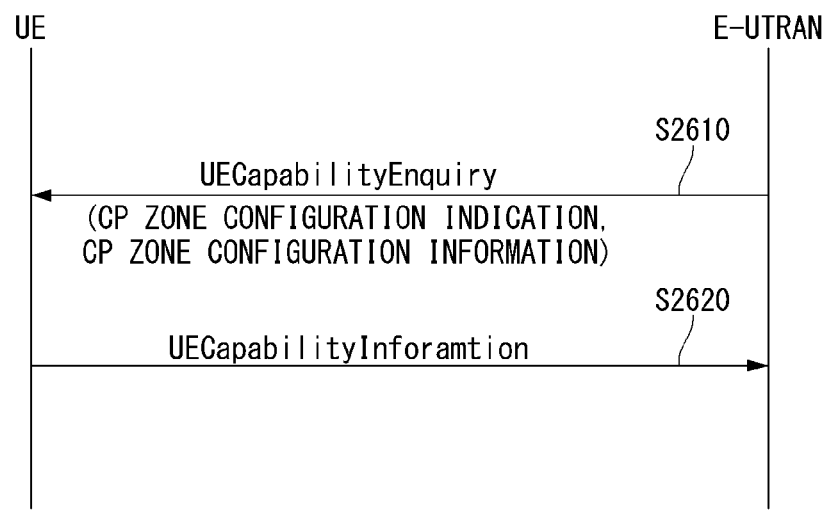
[Figure 26]

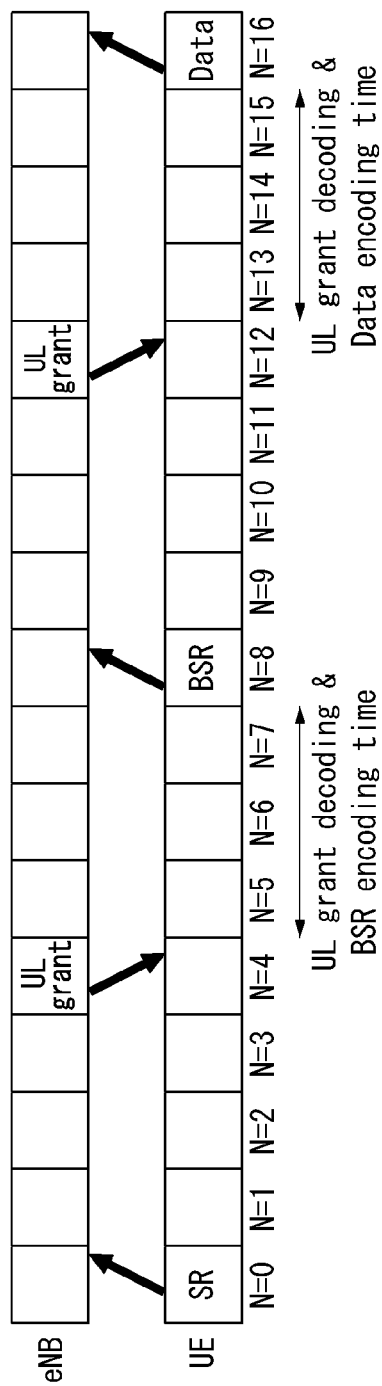
[Figure 27]

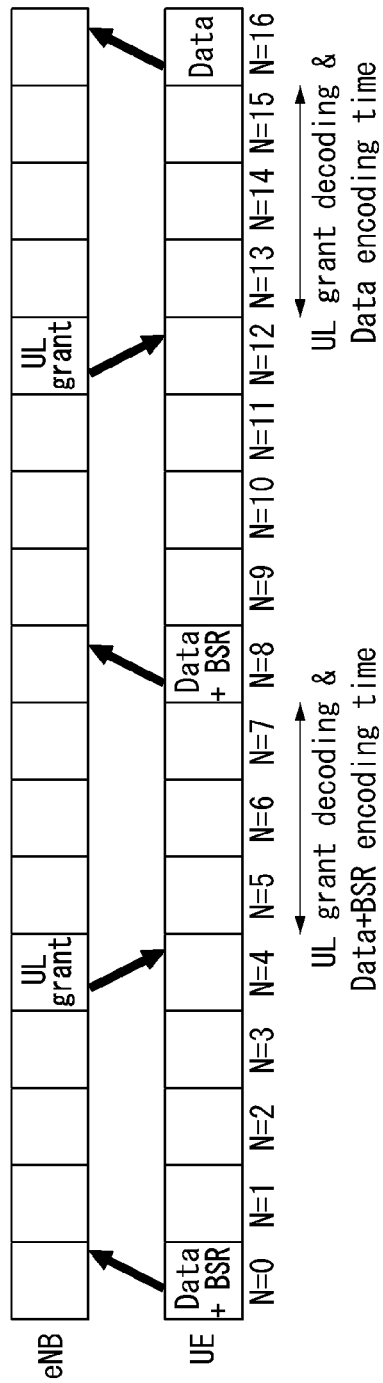
[Figure 28]

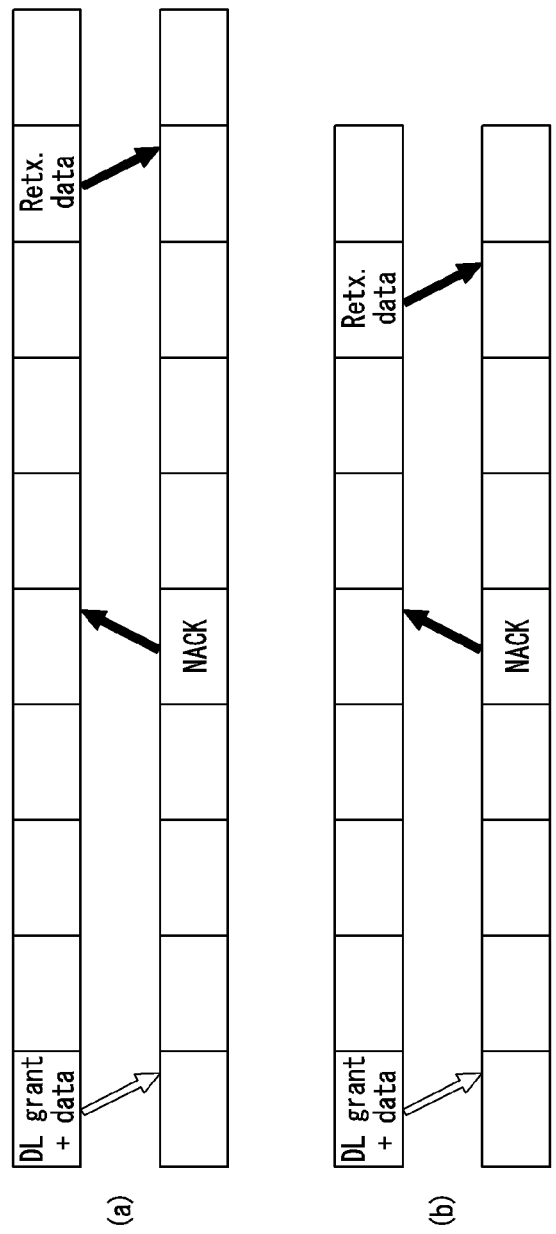
[Figure 29]

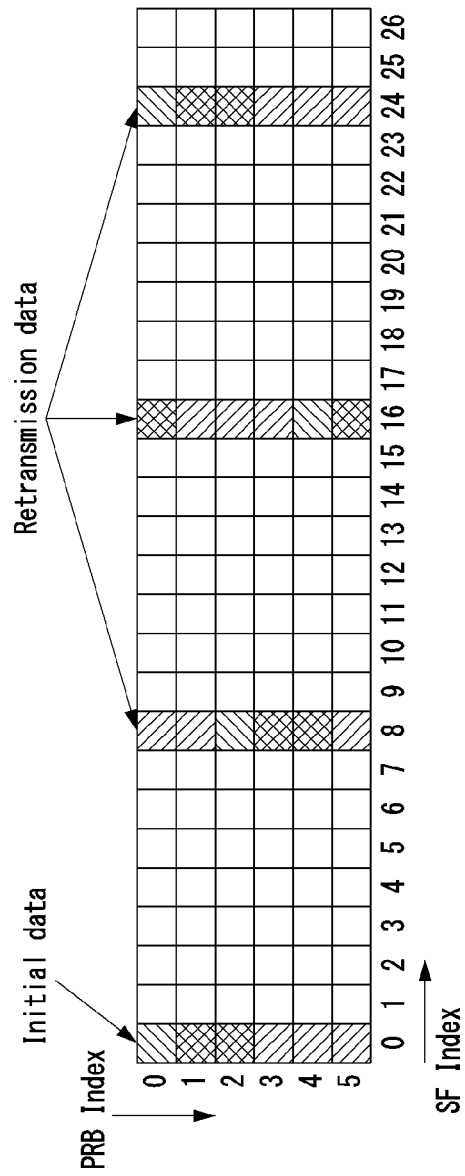
[Figure 30]

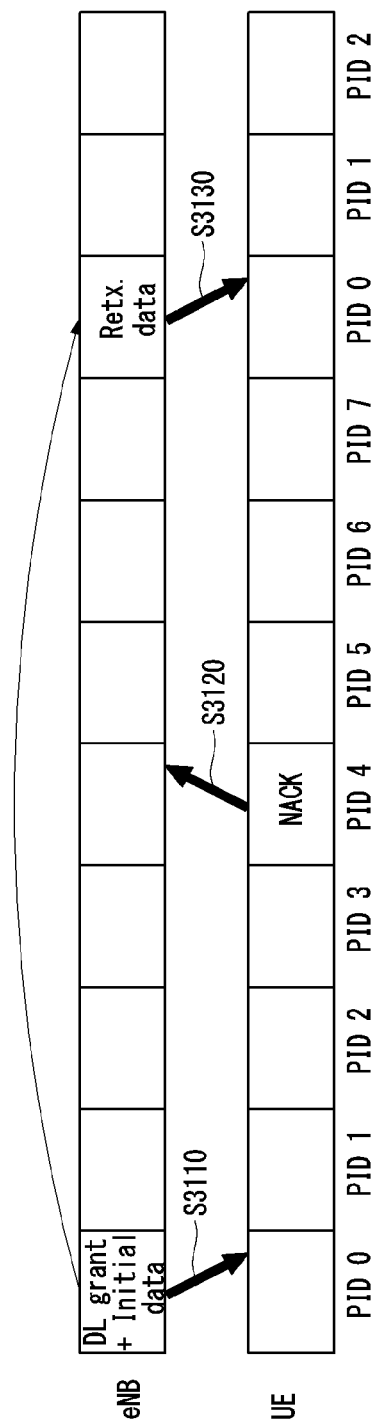
[Figure 31]

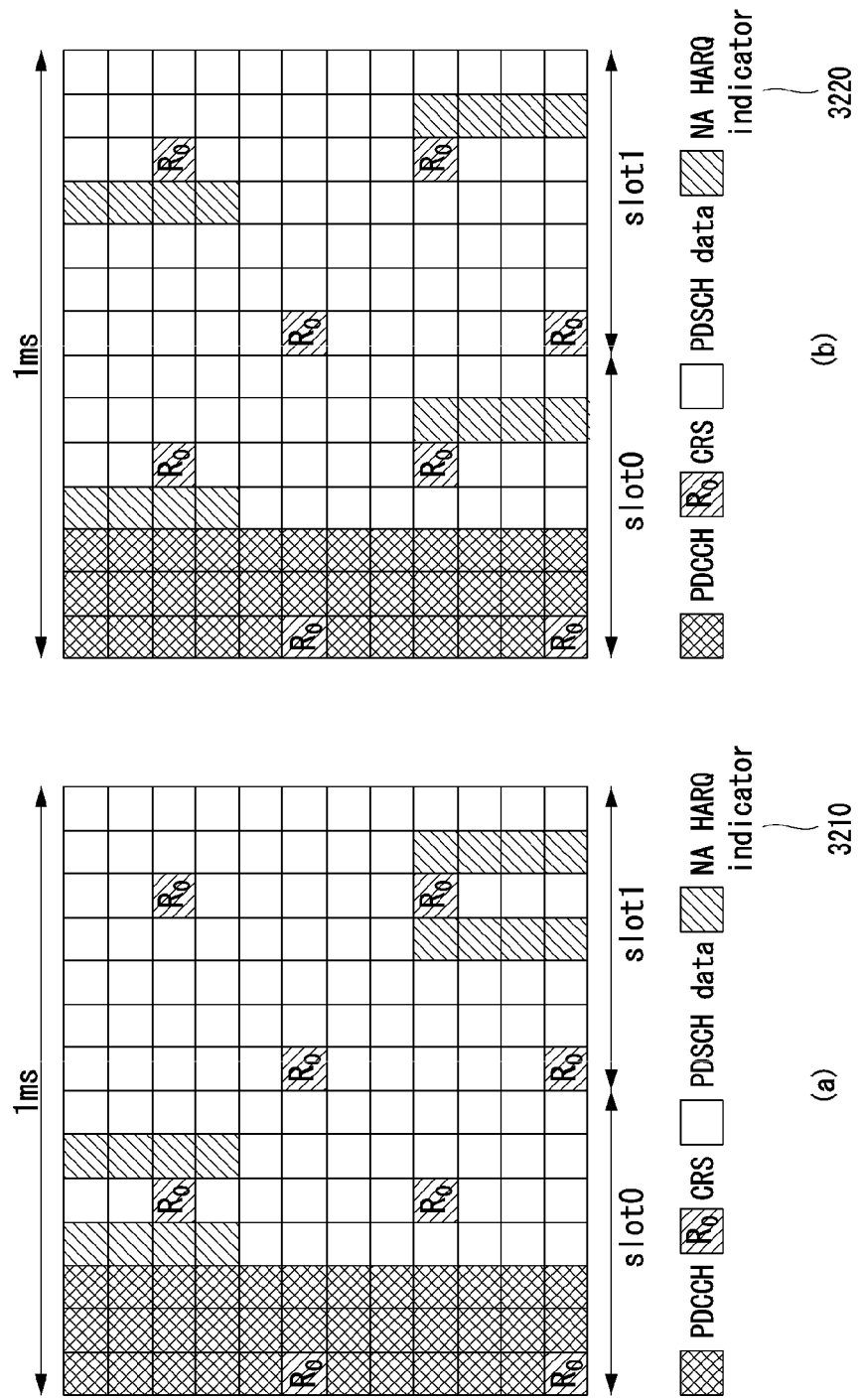
[Figure 32]

【Figure 33】
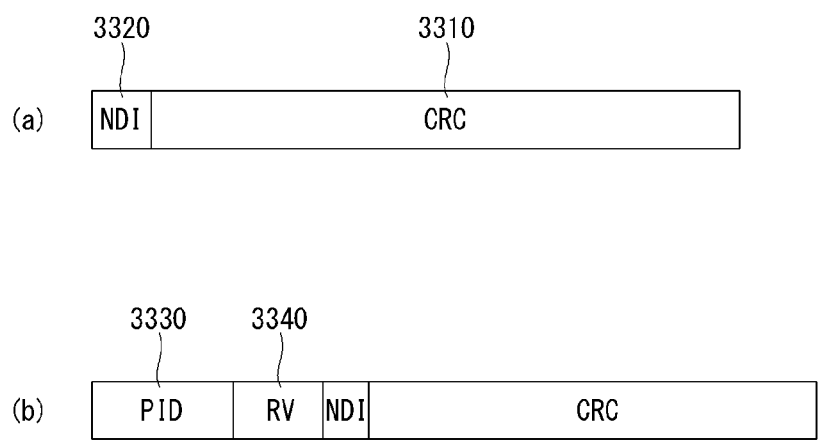

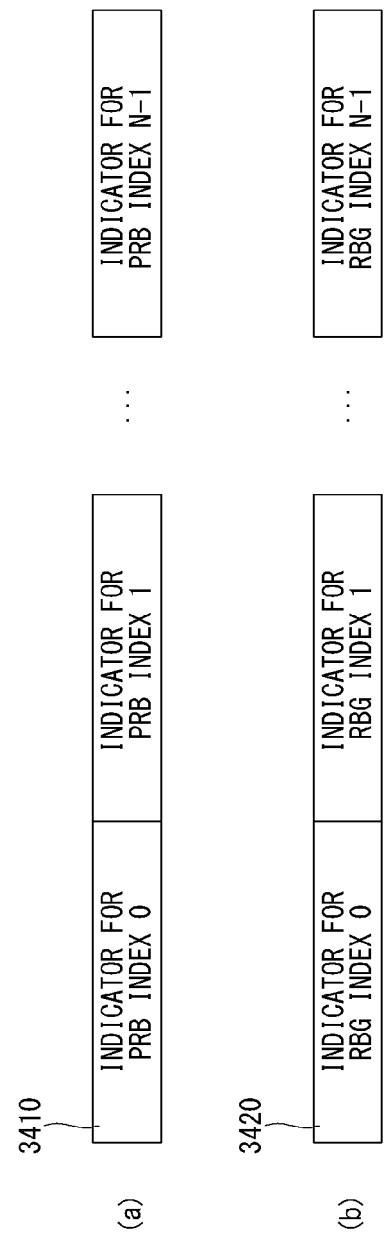

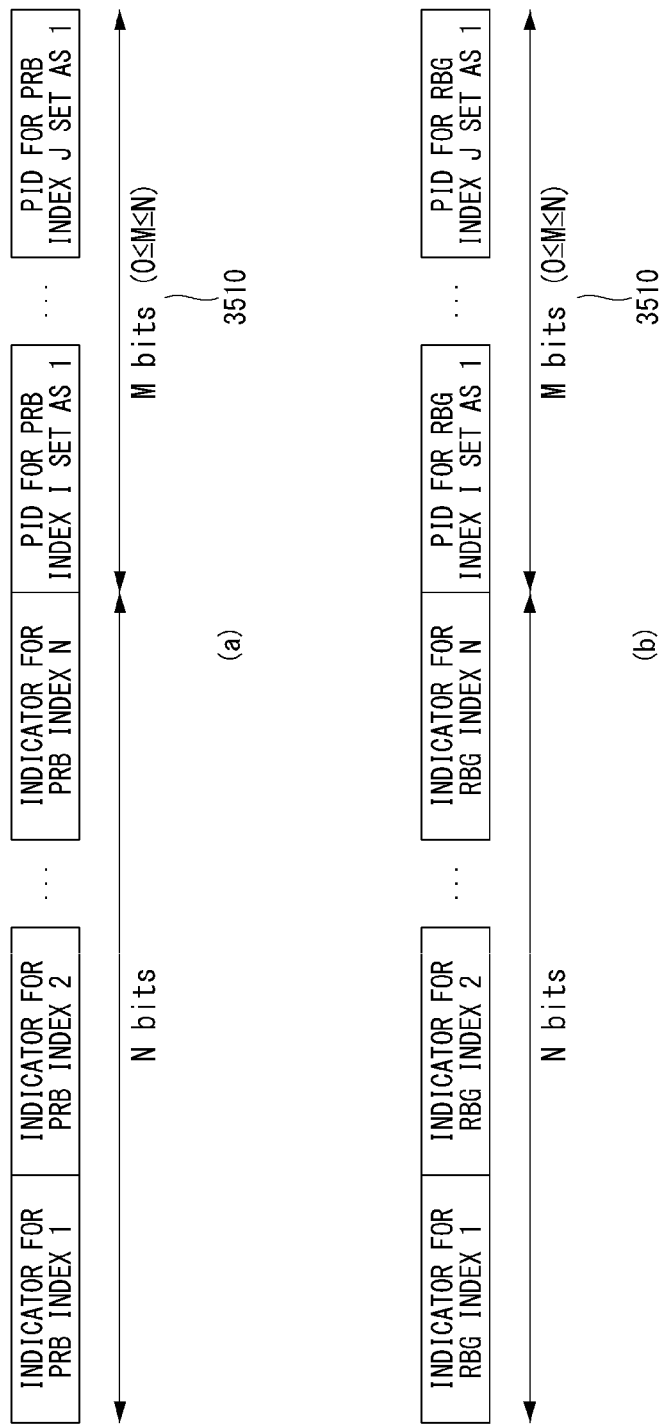
[Figure 35]

[Figure 36]
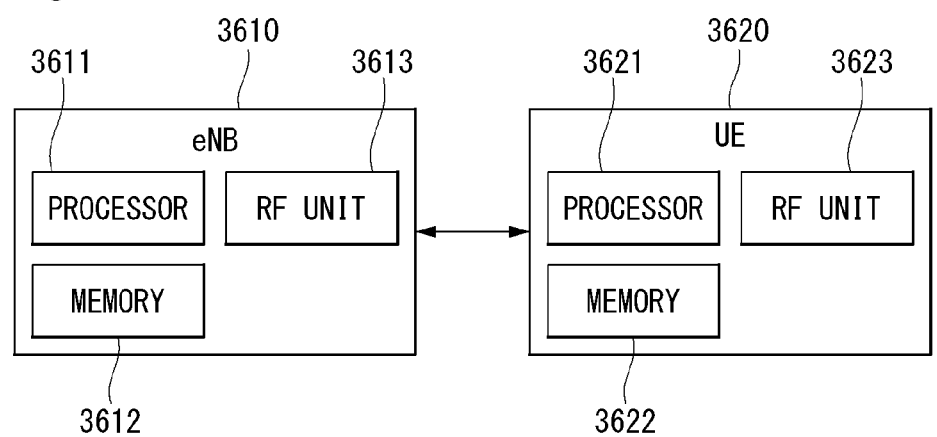

METHOD FOR TRANSMITTING AND RECEIVING DOWNLINK DATA IN WIRELESS COMMUNICATION SYSTEM, AND APPARATUS THEREFOR

CROSS REFERENCE TO RELATED APPLICATIONS

This application is the National Phase of PCT international Application No. PCT/KR2015/014353, filed on Dec. 28, 2015, which claims priority under 35 U.S.C. 119(e) to U.S. Provisional Application No. 62/207,934, filed on Aug. 21, 2015, all of which are hereby expressly incorporated by reference into the present application.

TECHNICAL FIELD

The present invention relates to wireless communication systems, and more particularly, to a method for transmitting and receiving downlink data and an apparatus for supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An object of the present disclosure is to provide a method for performing non-adaptive DL HARQ in order to decrease overhead for a downlink control information transmission in a frame structure of a wireless communication to which short TTI is applied.

For this, an object of the present disclosure is to provide (1) a method of omitting downlink control information and (2) a simple method of transmitting downlink control information.

In addition, an object of the present disclosure is to provide a method for differently allocating a frequency resource to be used in each downlink data retransmission for diversity effect.

In addition, an object of the present disclosure is to newly define a retransmission indicator for indicating whether the downlink data transmitted without a DL grant is retransmission data or new data In addition, an object of the present disclosure is to provide a method for transmitting a retransmission indicator through various schemes.

The technical objects to attain in the present disclosure are not limited to the above-described technical objects and other technical objects which are not described herein will become apparent to those skilled in the art from the following description.

Technical Solution

A method for transmitting and receiving downlink (DL) data performed by a user equipment (UE) in a wireless communication system according to the present disclosure includes receiving a first DL grant from a base station (BS); receiving first DL data based on the first DL grant from the BS; transmitting a HARQ response in response to the first DL data to the BS; and receiving one or more second DL data from the BS, and a specific frequency shift pattern is set in a frequency region between a resource in which the second DL data is received and a resource in which the first DL data is received, or between resources in which the second DL data are received.

In addition, in the present disclosure, the first DL data is initial DL data, and the one or more second DL data are retransmission data for the first DL data.

In addition, in the present disclosure, the one or more second DL data are received in a frequency shifted resource as much as a predetermined value from the resource in which the first DL data is received or from the resource in which the second DL data is received in a frequency region.

In addition, in the present disclosure, the specific frequency shift pattern is determined by Lowest PRB $\mathrm{index}_{(i+1)^{th}\ data} = (\mathrm{Lowest\ PRB\ index}_{i^{th}\ data} + \mathrm{shift}_n)\%\ N_{RB}$.

In addition, in the present disclosure, the one or more second DL data are received from the BS after a predetermined time from the time when the HARQ response is transmitted.

In addition, the present disclosure further includes receiving a retransmission indicator indicating that the one or more second DL data are data which are retransmitted without a DL grant in relation to a reception of the one or more second DL data.

In addition, in the present disclosure, the retransmission indicator is received from the BS by being multiplexed with the one or more second DL data in a PDSCH resource region.

In addition, in the present disclosure, the retransmission indicator is allocated in a unit of resource element (RE) or in a unit of resource block (RB) in the PDSCH resource region.

In addition, in the present disclosure, the retransmission indicator is allocated in a resource except the resource allocated for a reference signal (RS) or DL data.

In addition, in the present disclosure, the retransmission indicator is allocated in both symbols of a symbol allocated for the reference signal or allocated in any one side symbol of a symbol allocated for the reference signal.

In addition, the present disclosure further includes receiving control information in relation to a resource position to which the retransmission indicator is allocated, and the control information is received through an RRC message, a MAC message or a DL grant.

In addition, the present disclosure further includes determining whether to perform HARQ combining of the first DL data and the one or more second DL data based on the received retransmission indicator.

In addition, the present disclosure further includes receiving a simple DL grant including resource information in relation to a reception of the one or more second DL data from the BS.

In addition, in the present disclosure, the simple DL grant is received through a UE-specific Search Space (USS) of a Physical Downlink Control Channel (PDCCH), and the simple DL grant is received in a unit of simple Control Channel Elements (CCEs).

In addition, in the present disclosure, the simple DL grant includes at least one of a CRC field or a New Data Indicator (NDI) field, when synchronous HARQ is applied.

In addition, in the present disclosure, the simple DL grant includes at least one of a CRC field, a New Data Indicator (NDI) field or a HARQ related field, when asynchronous HARQ is applied.

In addition, in the present disclosure, the NDI field is information indicating whether the received DL data is retransmission data or new data.

In addition, in the present disclosure, the simple DL grant is received through a Common Search Space (CSS) of a PDCCH, the simple DL grant includes at least one retransmission indicator only, and the retransmission indicator is information indicating that the one or more second DL data are data retransmitted without a DL grant in relation to a reception of the one or more second DL data.

In addition, in the present disclosure, the simple DL grant further includes a PID field indicating a HARQ process ID (PID) for the one or more second DL data when the retransmission indicator is set as a value indicating retransmission data.

In addition, in the present disclosure, the retransmission indicator is received through a Physical Retransmission Indicator Channel (PRICH), and a resource of the PRICH is mapped by at least one of a lowest Physical Resource Block (PRB) index of the second DL data or DL antenna port layer.

In addition, in the present disclosure, a resource index pair $(n_{PRICH}^{group}, n_{PRICH}^{seq})$ of the physical retransmission indicator channel are determined by $n_{PRICH}^{group}=(I_{PRB_{RA}}+n_{LAYER}) \bmod N_{PRICH}^{group}+I_{PRICH}^{group}$ and $n_{PRICH}^{seq}=(\lfloor I_{PRB\_RA}/N_{PRICH}^{group} \rfloor + n_{LAYER}) \bmod 2N_{SF}^{PRICH}$, respectively.

In addition, a user equipment (UE) for transmitting and receiving downlink (DL) data in a wireless communication system according to the present disclosure includes a radio frequency (RF) unit for transmitting and receiving a radio signal; and a processor functionally connected to the RF unit, the processor is configured to perform: receiving a first DL grant from a base station (BS); receiving first DL data based on the first DL grant from the BS; transmitting a HARQ response in response to the first DL data to the BS; and receiving at least one second DL data from the BS, and a specific frequency shift pattern is set in a frequency region between a resource in which the at least one second DL data is received and a resource in which the first DL data is received, or between resources in which the at least one second DL data are received.

Technical Effects

According to the present disclosure, non-adaptive DL HARQ method is applied, and there is an effect that overhead for a downlink control information transmission may be decreased.

In addition, according to the present disclosure, a frequency resource used is differently allocated in each downlink data retransmission, and diversity effect may be obtained.

The technical effects obtained in the present invention are not limited to the technical effects described above, and other technical effects not mentioned herein may be understood to those skilled in the art from the description below.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates an example of a network structure of an evolved universal terrestrial radio access network (E-UTRAN) to which the present invention can be applied.

FIG. 2 illustrates a radio interface protocol structure between a UE and an E-UTRAN in the wireless communication system to which the present invention can be applied.

FIG. 3 is a diagram for describing physical channels and a general signal transmission method using them used in the 3GPP LTE/LTE-A system to which the present invention can be applied.

FIG. 4 is a diagram showing the structure of a radio frame used in a 3GPP LTE/LTE-A system to which the present invention can be applied.

FIG. 5 shows an example of a resource grid for one downlink slot in the wireless communication system to which the present invention can be applied.

FIG. 6 shows a structure of a downlink subframe in the wireless communication system to which the present invention can be applied.

FIG. 7 shows a structure of an uplink subframe in the wireless communication system to which the present invention can be applied.

FIG. 8 illustrates the MAC PDU used in the MAC entity in the wireless communication system to which the present invention can be applied.

FIG. 9 and FIG. 10 illustrate the sub-header of the MAC PDU in the wireless communication system to which the present invention can be applied.

FIG. 11 illustrates formats of the MAC control elements in order to report the buffer state in the wireless communication system to which the present invention can be applied.

FIG. 12 illustrates a UL resource allocation procedure of a UE in the wireless communication system to which the present application can be applied.

FIG. 13 illustrates an example of a random access procedure to which present application can be applied.

FIG. 14 illustrates an example of a type in which PUCCH formats are mapped to a PUCCH region of an uplink physical resource block in the wireless communication system to which the present invention may be applied.

FIG. 15 shows the structure of an ACK/NACK channel in the case of a common CP in a wireless communication system to which an embodiment of the present invention may be applied.

FIG. 16 illustrates an example of asynchronous HARQ operation in downlink.

FIG. 17 illustrates an example of synchronous HARQ operation in downlink.

FIG. 18 is a diagram illustrating an example of DCI format 0.

FIG. 19 is a block diagram illustrating a structure of a PDCCH.

FIG. 20 illustrates an example of resource mapping of a PDCCH.

FIG. 21 illustrates an example of distributing CCEs across a system band.

FIG. 22 illustrates an example of PDCCH monitoring.

FIG. 23 is a diagram illustrating an example of a logical channel prioritization in the LTE system.

FIG. 24 illustrates an example of a signal processing procedure of a UL shared channel which is a transport channel in a wireless communication system to which the present invention may be applied.

FIG. 25 illustrates a reference signal pattern mapped to a downlink resource block pair in the wireless communication system to which the present invention may be applied.

FIGS. 26 and 27 are diagrams illustrating an example of a method for transmitting actual data through scheduling request and BSR procedure.

FIG. 28 is a diagram illustrating a method for transmitting actual data through RACH procedure.

FIG. 29 is a main diagram of a downlink HARQ operation proposed in the present disclosure.

FIG. 30 is a diagram illustrating an example of a method for retransmitting DL data in non-adaptive HARQ scheme by using frequency hopping and shift pattern proposed in the present disclosure.

FIG. 31 is a diagram illustrating an example of a data retransmission method through DL grant omission proposed in the present disclosure.

FIG. 32 is a diagram illustrating an example of a method for multiplexing DL retransmission data in a PDSCH resource and a non-adaptive HARQ indicator proposed in the present disclosure.

FIGS. 33 to 35 illustrate examples of a simple DL grant format proposed in the present disclosure.

FIG. 36 illustrates a block diagram of a wireless communication apparatus to which the methods proposed in the present disclosure may be applied.

BEST MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB.

Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a schematic structure a network structure of an evolved universal mobile telecommunication system (E-UTRAN) to which the present invention can be applied.

An E-UTRAN system is an evolved version of the UTRAN system. For example, the E-UTRAN may be also referred to as an LTE/LTE-A system. The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates a radio interface protocol structure defined between a UE and an E-UTRAN in a wireless communication system to which the present invention can be applied. FIG. 2(a) illustrates a radio protocol structure of a control plane, and FIG. 2(b) illustrates a radio protocol structure of a user plane.

With reference to FIG. 2, layers of a radio interface protocol between the UE and the E-UTRAN can be classified into a first layer (L1), a second layer (L2), and a third layer (L3) based on the lower three layers of the open system interconnection (OSI) model that is well-known in the communication system technology field. The radio interface protocol between the UE and the E-UTRAN is divided horizontally into a physical layer, a data link layer, and a network layer; and divided vertically into a user plane which is a protocol stack for data information transmission and a control plane which is a protocol stack for transmission of a control signal.

The control plane refers to a path along which control messages for the UE and the network to manage calls are transmitted. The user plane refers to a path along which data created in the application layer, for example, voice data or Internet packet data are transmitted. In what follows, the control plane and the user plane of the radio protocol will be described. The physical (PHY) layer belonging to the first layer provides an information transfer service to an upper layer by using a physical channel. The PHY layer is connected to the medium access control (MAC) layer belonging to the upper layer through a transport channel, and data are transferred between the MAC layer and the PHY layer through the transport channel. The transport channel is classified according to how and with what characteristics data are transferred through a radio interface. And a physical channel is employed to transfer data between disparate physical layers and between a physical layer of a transmitter end and a physical layer of a receiver end. The physical layer is modulated by OFDM scheme and uses time and frequency as radio resources.

There are a few physical control channels used in the physical layer. A physical downlink control channel (PDCCH) informs the UE of a paging channel (PCH), resource allocation of a downlink shard channel (DL-SCH), and hybrid automatic repeat request (HARQ) information related to an uplink shared channel (UL-SCH). Also, the PDCCH can carry an uplink grant which informs the UE of resource allocation for uplink transmission. A physical control format indicator channel (PDFICH) informs the UE of the number of OFDM symbols used for the PDCCHs and is transmitted for each subframe. A physical HARQ indicator channel (PHICH) carries a HARQ acknowledge (ACK)/non-acknowledge (NACK) signal in response to the uplink transmission. A physical uplink control channel (PUCCH) carries requests scheduling of the HARQ ACK/NACK signal for downlink transmission and carries uplink control information such as a channel quality indicator (CQI). A physical uplink shared channel (PUSCH) carries an UL-SCH.

The MAC layer of the second layer (L2) provides a service to its upper layer, radio link control (RLC) layer, through a logical channel. Functions of the MAC layer includes mapping between a logical channel and a transport channel; and multiplexing/demultiplexing of transport blocks provided to a physical channel on a transport channel of a MAC service data unit (SDU) belonging to the logical channel.

The RLC layer of the second layer (L2) supports reliable transmission of data. Functions of the RLC layer include concatenation, segmentation, and reassembly of the RLC SDU. To ensure various levels of quality of service (QoS) that a radio bearer (RB) requests, the RLC layer provides three operating modes: transparent mode (TM), unacknowledged mode (UM), and acknowledge mode (AM). The AM RLC provides error correction through an automatic repeat request (ARQ). Meanwhile, in case the MAC layer carries the RLC function, the RLC layer can be included as a functional block of the MAC layer.

A packet data convergence protocol (PDCP) layer of the second layer (L2) carries functions of transfer of user data in the user plane, header compression, and ciphering. The header compression refers to the function of reducing the size of the IP packet header which carries relatively large and unnecessary control information so that Internet protocol (IP) packets such as the Internet protocol version 4 (IPv4) or the Internet protocol version 6 (IPv6) can be transmitted efficiently through a radio interface with narrow bandwidth. Functions of the PDCP layer in the control plane include transfer of plane data and ciphering/integrity protection.

The radio resource control (RRC) layer located in the lowest part of the third layer (L3) is defined only in the control plane. The RRC layer controls radio resources between the UE and a network. To this end, the UE and the network exchanges RRC messages through the RRC layer. The RRC layer controls a logical channel, a transport channel, and a physical channel related to configuration, re-configuration, and release of radio bearers. A radio bearer refers to a logical path that the second layer (L2) provides for data transmission between the UE and the network. Configuring a radio bearer indicates that a radio protocol layer and channel characteristics are defined for providing a particular service and specific parameters and an operating method thereof are set up. A radio bearer is again divided into a signaling RB (SRB) and a data RB (DRB). The SRB is used as a path for transmitting RRC messages in the control plan, and the DRB is used as a path for transmitting user data in the user plane.

The non-access stratum (NAS) layer located in the upper hierarchy of the RRC layer performs the function of session management, mobility management, and so on.

A cell constituting an eNB has bandwidth chosen from among 1.25, 2.5, 5, 10, 2 MHz and provides a downlink or an uplink transmission service to UEs. Bandwidth configuration can be carried out so that different cells have bandwidth different from each other.

Downlink transport channels for transporting data from a network to a UE include a broadcast channel (BCH) which transmits system information, a PCH which transmits a paging message, a DL-SCH which transmits user traffic or a control message. Downlink multicast or broadcast service traffic or a control message may be transmitted through the DL-SCH or through a separate multicast channel (MCH). Meanwhile, uplink transport channels for transporting data from the UE to the network include a random access channel (RACH) which transmits the initial control message and an uplink shared channel which transmits user traffic or a control message.

A logical channel lies in the upper hierarchy of a transport channel and is mapped to the transport channel. A logical channel is divided into a control channel for transmission of control area information and a traffic channel for transmission of user area information. Logical channels include a broadcast control channel (BCCH), a paging control channel (PCCH), a common control channel (CCCH), a dedicated control channel (DCCH), a multicast control channel (MCCH), a dedicated traffic channel (DTCH), and a multicast traffic channel (MTCH).

To manage a UE and mobility of the UE in the NAS layer located in the control plane, an EPS mobility management (EMM) registered state and an EMM-deregistered state can be defined. The EMM registered state and the EMM de-registered sate can be applied to the UE and the MME. As in the case when the UE is powered on for the first time, the UE at its initial stage is in the EMM-deregistered state and carries out a process of registering for a network through an initial attach procedure to connect to the corresponding network. If the connection procedure is carried out successfully, the UE and the MME then make a transition to the EMM-registered state.

Also, to manage signaling connection between the UE and the network, an EPS connection management (ECM) connected state and an ECM-IDLE state can be defined. The ECM-CONNECTED state and the ECM-IDLE state can also be applied to the UE and the MME. The ECM connection includes an RRC connection established between the UE and an eNB and an S1 signaling connection established between the eNB and the MME. The RRC state indicates whether the RRC layer of the UE and the RRC layer of the eNB are connected logically to each other. In other words, if the RRC layer of the UE is connected to the RRC layer of the eNB, the UE stays in an RRC_CONNECTED state. If the RRC layer of the UE and the RRC layer of the eNB are not connected to each other, the UE stays in an RRC_IDLE state.

A network is capable of perceiving existence of a UE in the ECM-CONNECTED state at the cell level and controlling the UE in an effective manner. On the other hand, the network is unable to perceive the existence of a UE in the ECM-IDLE state, and a core network (CN) manages the UE on the basis of a tracking area which is a regional unit larger than the cell. If the UE is in the ECM-IDLE state, the UE carries out discontinuous reception (DRX) that the NAS configures by using the ID assigned uniquely in the tracking area. In other words, the UE can receive broadcast data of system information and paging information by monitoring a paging signal in a particular paging opportunity at each UE-particular paging DRX cycle. When the UE is in the ECM-IDLE state, the network does not hold context information of the UE. Therefore, the UE in the ECM-IDLE state can carry out a mobility-related procedure based on the UE such as cell selection or cell reselection without having to take an order of the network. In case the position of the UE in the ECM-IDLE state changes from the position known to the network, the UE can inform the network about its position through a tracking area update (TAU) procedure. On the other hand, if the UE is in the ECM-CONNECTED state, mobility of the UE is managed by the command of the network. While the UE is in the ECM-CONNECTED state, the network is informed of the cell to which the UE belongs to. Therefore, the network transmits and receives data to and from the UE, controls mobility such as the UE's handover, and carries out cell measurement of neighboring cells.

As described above, in order for the UE to receive a conventional mobile communication service such as voice or data communication, the UE needs to make a transition to the ECM-CONNECTED state. When the UE is powered on for the first time, the UE at its initial stage stays in the ECM-IDLE state similarly as done for the EMM state; if the UE is registered successfully to the corresponding network through the initial attach procedure, the UE and the MME make a transition to the ECM-CONNECTED state. Also, if the UE is registered in the network but radio resources are not assigned as traffic is deactivated, the UE stays in the ECM-IDLE state; if new uplink or downlink traffic is generated for the corresponding UE, the UE and the MME make a transition to the ECM-CONNECTED state through a service request procedure.

FIG. 3 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S301 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S302 step to obtain more specific system information.

Next, the UE may carry out a random access procedure such as the steps of S303 to S306 to complete a connection process to the eNB. To this purpose, the UE transmits a preamble S303 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S306.

Afterwards, the UE which has carried out the procedure above may carry out reception S307 of the PDCCH signal and/or PDSCH signal and transmission S308 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(*a*) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(*b*) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, . . . , $N_{RB}$×12−1) denotes an index of subcarrier in the frequency domain, and l(l=0, . . . , 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

The DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Buffer Status Reporting (BSR)

FIG. 8 illustrates the MAC PDU used in the MAC entity in the wireless communication system to which the present invention can be applied.

Referring to FIG. 8, the MAC PDU includes a MAC header, at least one MAC service data unit (SDU) and at least one control element, additionally may include padding. In some cases, at least one of the MAC SDUs and the MAC control elements may not be included in the MAC PDU.

As an example of FIG. 8, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 8, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 8, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 8, the sub-header that is included four header fields may be used. In case that the sub-header includes four fields like this, the four fields may be R/R/E/LCID.

FIG. 9 and FIG. 10 illustrate the sub-header of the MAC PDU in the wireless communication system to which the present invention can be applied.

Each field is described as below with reference to FIG. 9 and FIG. 10.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 2 represents the value of LCID for the DL-SCH

TABLE 2

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 3 represents the value of LCID for the UL-SCH

TABLE 3

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 2 and Table 3 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 9(a)), otherwise, the 15-bit L field may be used (FIG. 9(b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 10.

FIG. 11 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 11(a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 11(b), may include four buffer size fields indicating the buffer state of four groups having 0 to 3 LCG IDs. Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated, and the UE transmits the scheduling request (SR) to an eNB first in order to be allocated with the PUSCH resources (step, S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OO) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1203), the UE transmits the triggered BSR through the PUSCH resources which are allocated by the UL grant (step, S1205).

The eNB verifies the quality of data that the UE actually transmit to the UL through the BSR, and transmits the UL grant for the PUSCH resources for actual data transmission to the UE (step, S1207). The UE that receives the UL grant for actual data transmission transmits the actual UL data to the eNB through the PUSCH resources (step, S1209).

FIG. 12(b) exemplifies the UL resource allocation procedure for actual data in case that the UL radio resources for the BSR are allocated to a UE.

Referring to FIG. 12(b), the case that the PUSCH resources for BRS transmission are already allocated to a UE is illustrated. In the case, the UE transmits the BSR through the allocated PUSCH resources, and transmits a scheduling request to an eNB (step, S1211). Subsequently, the eNB verifies the quality of data to be transmitted to the UL by the UE through the BSR, and transmits the UL grant for the PUSCH resources for actual data transmission to the UE (step, S1213). The UE that receives the UL grant for actual data transmission transmits the actual UL data to the eNB through the allocated PUSCH resources (step, S1215).

FIG. 13 is a diagram for describing a latency in C-plane required in 3GPP LTE-A to which the present invention can be applied.

Referring to FIG. 13, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized
Random Access Channel (RACH) Procedure FIGS. 13a and 13b illustrate one example of a random access procedure in the LTE system.

The random access procedure is carried out during initial connection in the RCC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 13a illustrates one example of a contention-based random access procedure, and FIG. 13b illustrates one example of a non-contention based random access procedure.

First, the contention-based random access procedure will be described with reference to FIG. 13a.

The UE receives information about random access from the eNB through system information and stores the received information. Afterwards, in case random access is needed, the UE transmits a random access preamble (which is also called a message 1) to the eNB S1301.

If the eNB receives a random access preamble from the UE, the eNB transmits a random access response message (which is also called a message 2) to the UE S1302. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1303. At this time, uplink transmission may be described as scheduled transmission.

After receiving the uplink transmission from the UE, the eNB transmits a message for contention resolution (which is also called a message 4) to the UE through a downlink shared channel (DL-SCH) S1304.

Next, a non-contention based random access procedure will be described with reference to FIG. 13b.

Before the UE transmits a random access preamble, the eNB allocates a non-contention random access preamble to the UE S1311.

The non-contention random access preamble can be allocated through a handover command or dedicated signaling such as signaling through the PDCCH. In case non-contention random access preamble is allocated to the UE, the UE transmits the allocated non-contention random access preamble to the eNB S1312.

Afterwards, similarly to the S1302 step of the contention-based random access procedure, the UE can transmit a random access response (which is also called a message 2) to the UE S1313.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Physical Uplink Control Channel (PUCCH)

Uplink control information (UCI) transmitted through a PUCCH may include a scheduling request (SR), HARQ ACK/NACK information and downlink channel measurement information.

The HARQ ACK/NACK information may be generated depending on whether a downlink data packet on a PDSCH has been successfully decoded or not. In an existing wireless communication system, 1 bit is transmitted as ACK/NACK information with respect to the transmission of downlink single codeword, and 2 bits are transmitted as ACK/NACK information with respect to the transmission of downlink 2 codewords.

The channel measurement information refers to feedback information related to a multiple input multiple output (MIMO) scheme, and may include a channel quality indicator (CQI), a precoding matrix index (PMI) and a rank indicator (RI). Pieces of these channel measurement information may be collectively expressed as a CQI.

For the transmission of a CQI, 20 bits may be used per subframe.

A PUCCH may be modulated using binary phase shift keying (BPSK) scheme and a quadrature phase shift keying (QPSK) scheme. Control information of a plurality of UEs may be transmitted through a PUCCH. If code division multiplexing (CDM) is performed to distinguish the signals of UEs, a constant amplitude zero autocorrelation (CAZAC) sequence of a length 12 is chiefly used. The CAZAC sequence has a characteristic in that it maintains constant amplitude in a time domain and a frequency domain, and thus has a property suitable for increasing coverage by lowering the peak-to-average power ratio (PAPR) or cubic metric (CM) of a UE. Furthermore, ACK/NACK information for downlink data transmission transmitted through a PUCCH is covered using orthogonal sequence or orthogonal cover (OC).

Furthermore, control information transmitted on a PUCCH may be distinguished using a cyclically shifted sequence having a different cyclic shift (CS) value. The cyclically shifted sequence may be generated by cyclically shifting a base sequence by a specific CS amount. The specific CS amount is indicated by a CS index. The number of available cyclic shifts may be different depending on the latency spread of a channel. A variety of types of sequences may be used as the base sequence, and the aforementioned CAZAC sequence is an example thereof.

Furthermore, the amount of control information which may be transmitted by a UE in one subframe may be determined depending on the number of SC-FDMA symbols which may be used to send control information (i.e., SC-FDMA symbols other than an SC-FDMA symbol used in the transmission of a reference signal (RS) for the coherent detection of a PUCCH.

In the 3GPP LTE system, a PUCCH is defined as a total of different formats depending on transmitted control information, a modulation scheme and the amount of control information. The attributes of uplink control information (UCI) transmitted may be summarized as in Table 4 below depending on each PUCCH format.

TABLE 4

| PUCCH format | Modulation scheme | # of bits per subframe | Usage |
| --- | --- | --- | --- |
| 1(x) | N/A | N/A | Scheduling Request |
| 1a | BPSK | 1 | 1-bit A/N + SR |
| 1b | QPSK | 2 | 2-bits A/N + SR |
| 2x | QPSK | 20 | CQI or CQI + A/N |
| 2a | QPSK + BPSK | 20 + 1 | CQI + 1-bit A/N |
| 2b | QPSK + BPSK | 20 + 2 | CQI + 2-bits A/N |
| 3 | QPSK | 48 | A/N + SR |

PUCCH format 1(x) is used for SR-only transmission. In the case of SR-only transmission, a waveform which is not modulated is applied.

The PUCCH format 1a or 1b is used to transmit HARQ ACK/NACK. In the case that HARQ ACK/NACK is solely transmitted in a specific subframe, PUCCH format 1a or 1b may be used. Alternatively, HARQ ACK/NACK and an SR may be transmitted in the same subframe using PUCCH format 1a or 1b.

As described above, PUCCH format 1a or 1b may be used for the case that an SR is transmitted together with HARQ ACK/NACK. A PUCCH index for HARQ ACK/NACK is implicitly determined from a lower CCE index which is mapped for the related PDCCH.

Multiplexing Negative SR with A/N

A UE transmits A/N to A/N PUCCH resource which is mapped to the lowest CCE index used in a PDCCH.

Multiplexing Positive SR with A/N

: A UE transmits A/N using the SR PUCCH resource allocated from an eNB.

PUCCH format 2 is used for the transmission of a CQI, and PUCCH format 2a or 2b is used for the transmission of a CQI and HARQ ACK/NACK.

In the case of the extended CP, PUCCH format 2 may also be used for the transmission of a CQI and HARQ ACK/NACK.

An SR resource of a UE is setup/released through an RRC Connection Reconfig. (Radio Resource Config. Dedicated (Physical config. Dedicated (SR config))).

Here, SR resource for maximum 2048 UEs is available to be allocated in one subframe. This means that 2048 logical indexes are defined for PUCCH, and the physical resource for PUCCH formats 1 to 3 may be mapped up to 2048 logically.

It is designed that an SR periodicity may be set to 1 ms to 80 ms according to an SR configuration index in the configuration of SR resource per UE, and an SR subframe offset is also configured according to an index.

An SR signaling of a UE is defined to use simple On-Off Keying (O.O.K) scheme, and defined to mean that D(0)=1: Request a PUSCH resource (positive SR), Transmitting nothing: not request to be scheduled (negative SR).

In addition, an SR is designed to use the CAZAC sequence having the length of 12 and the OC sequences having the length of 3 such that the SR for maximum 36 UEs is able to be allocated through PUCCH 1 RB (in the case of the Normal CP).

A DMRS position of PUCCH format 1/1a/1b(A/N, SR) will be described in detail below in FIG. 14.

FIG. 14 illustrates an example of a type in which PUCCH formats are mapped to a PUCCH region of an uplink physical resource block in the wireless communication system to which the present invention may be applied.

In FIG. 14, NRBUL represents the number of resource blocks in the uplink, and 0, 1, . . . , NRBUL−1 mean the numbers of physical resource blocks. Basically, the PUCCH is mapped to both edges of an uplink frequency block. As illustrated in FIG. 14, PUCCH format 2/2a/2b is mapped to a PUCCH region expressed as m=0, 1 and this may be expressed in such a manner that PUCCH format 2/2a/2b is mapped to resource blocks positioned at a band edge. Furthermore, both PUCCH format 2/2a/2b and PUCCH format 1/1a/1b may be mixedly mapped to a PUCCH region expressed as m=2.

Next, PUCCH format 1/1a/1b may be mapped to a PUCCH region expressed as m=3, 4, and 5. The number ($N_{RB}(2)$) of PUCCH RBs which are usable by PUCCH format 2/2a/2b may be indicated to UEs in a cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency unit (or a frequency resolution) to be measured may be controlled by an eNB. In the time domain, periodic and aperiodic CQI reporting may be supported. PUCCH format 2 may be used for only the periodic reporting and the PUSCH may be used for aperiodic reporting. In the case of the aperiodic reporting, an eNB may instruct a UE to transmit a scheduling resource on which an individual CQI reporting is carried for the uplink data transmission.

PUCCH Channel Structure

The PUCCH formats 1a and 1b are described.

In the PUCCH formats 1a/1b, a symbol modulated using the BPSK or QPSK modulation scheme is multiplied by a CAZAC sequence of a length 12. For example, the results of the multiplication of a modulation symbol d(0) by a CAZAC sequence r(n) (n=0, 1, 2, . . . , N−1) of a length N are y(0), y(1), y(2), . . . , y(N−1). y(0), . . . , y(N−1) symbols may be called a block of symbols. After a modulation symbol is multiplied by a CAZAC sequence, block-wise spreading using an orthogonal sequence is applied.

A Hadamard sequence of a length 4 is used for common ACK/NACK information, and a discrete Fourier transform (DFT) sequence of a length 3 is used for shortened ACK/NACK information and a reference signal.

A Hadamard sequence of a length 2 is used for a reference signal in the case of an extended CP.

FIG. 15 shows the structure of an ACK/NACK channel in the case of a common CP in a wireless communication system to which an embodiment of the present invention may be applied.

FIG. 15 illustrates the structure of a PUCCH channel for the transmission of HARQ ACK/NACK without a CQI.

A reference signal (RS) is carried on three contiguous SC-FDMA symbols that belong to seven SC-FDMA symbols included in one slot and that are located in the middle part, and an ACK/NACK signal is carried on the remaining four SC-FDMA symbols.

In the case of an extended CP, an RS may be carried on two contiguous symbols in the middle. The number and location of symbols used for an RS may be different depending on a control channel. The number and location of symbols used for an ACK/NACK signal associated with the RS may also be changed depending on the RS.

Pieces of acknowledgement information (an unscrambled state) of 1 bit and 2 bits may be expressed as one HARQ ACK/NACK modulation symbol using the BPSK and QPSK modulation schemes, respectively. Positive acknowledgement (ACK) may be encoded into "1", and negative acknowledgement (NACK) may be encoded into "0."

2-dimensional spreading is applied in order to improve a multiplexing capacity when a control signal is transmitted within an allocated band. That is, in order to increase the number of UEs or the number of control channels that may be multiplexed, frequency domain spreads and time domain spreads are applied at the same time.

In order to spread an ACK/NACK signal in the frequency domain, a frequency domain sequence is used as a base sequence. A Zadoff-Chu (ZC) sequence, that is, one of CAZAC sequences, may be used as a frequency domain sequence. For example, the multiplexing of different UEs or different control channels may be applied by applying a different cyclic shift (CS) to a ZC sequence, that is, a base sequence. The number of CS resources supported in an SC-FDMA symbol for PUCCH RBs for the transmission of HARQ ACK/NACK is set by a cell-specific higher layer signaling parameter $\Delta_{shift}^{PUCCH}$.

An ACK/NACK signal on which frequency domain spreading has been performed is spread in the time domain using orthogonal spreading code. A Walsh-Hadamard sequence or DFT sequence may be used as the orthogonal spreading code. For example, an ACK/NACK signal may be spread using orthogonal sequences w0, w1, w2 and w3 of a length 4 with respect to four symbols. Furthermore, an RS is also spread through an orthogonal sequence of a length 3 or a length 2. This is called orthogonal covering (OC).

A plurality of UEs may be multiplexed according to a code division multiplexing (CDM) method using the aforementioned CS resources in the frequency domain and the aforementioned OC resources in the time domain. That is, the ACK/NACK information and RSs of a large number of UEs on the same PUCCH RB may be multiplexed.

With respect to such time domain spreading CDM, the number of spreading codes supported with respect to ACK/NACK information is limited by the number of RS symbols. That is, since the number of RS transmission SC-FDMA symbols is smaller than that of ACK/NACK information transmission SC-FDMA symbols, the multiplexing capacity of an RS is smaller than that of ACK/NACK information.

For example, in the case of a common CP, ACK/NACK information may be transmitted in four symbols. Three orthogonal spreading codes not four orthogonal spreading codes are used for ACK/NACK information. The reason for this is that since the number of RS transmission symbols is limited to three, only the three orthogonal spreading codes may be used for an RS.

In the case where three symbols are used to send an RS and four symbols are used to send ACK/NACK information in one slot of a subframe of a common CP, for example, if six CSs can be used in the frequency domain and three orthogonal cover (OC) resources can be used in the time domain, HARQ acknowledgement from a total of 18 different UEs may be multiplexed within one PUCCH RB. In the case where two symbols are used to send an RS and four symbols are used to send ACK/NACK information in one slot of a subframe of an extended CP, for example, if six CSs can be used in the frequency domain and two orthogonal cover (OC) resources can be used in the time domain, HARQ acknowledgement from a total of 12 different UEs may be multiplexed within one PUCCH RB.

The PUCCH format 1 is described below. A scheduling request (SR) is transmitted in such a manner that a UE requests scheduling or does not scheduling. An SR channel reuses the ACK/NACK channel structure in the PUCCH formats 1a/1b and is configured according to an on-off keying (00K) method based on the ACK/NACK channel design. A reference signal is not transmitted in the SR channel. Accordingly, a sequence of a length 7 is used in the case of a common CP, and a sequence of a length 6 is used in the case of an extended CP. Different cyclic shifts or orthogonal covers may be allocated to an SR and ACK/NACK. That is, for positive SR transmission, a UE transmits HARQ ACK/NACK through resources allocated for the SR. For negative SR transmission, a UE transmits HARQ ACK/NACK through resources allocated for ACK/NACK.

An enhanced-PUCCH (e-PUCCH) format is described below. The e-PUCCH may correspond to the PUCCH format 3 of the LTE-A system. A block spreading scheme may be applied to ACK/NACK transmission using the PUCCH format 3.

The block spreading scheme is a method of modulating the transmission of a control signal using the SC-FDMA method unlike the existing PUCCH format 1 series or 2 series. As shown in FIG. 8, a symbol sequence may be spread on the time domain using orthogonal cover code (OCC) and transmitted. The control signals of a plurality of UEs may be multiplexed on the same RB using the OCC. In the case of the aforementioned PUCCH format 2, one symbol sequence is transmitted in the time domain and the control signals of a plurality of UEs are multiplexed using the cyclic shift (CS) of a CAZAC sequence. In contrast, in the case of a block spreading-based PUCCH format (e.g., the PUCCH format 3), one symbol sequence is transmitted in the frequency domain and the control signals of a plurality of UEs are multiplexed using time domain spreading using the OCC.

HARQ Process in LTE/LTE-A System

In the current LTE, 8 HARQ process is used for withdrawing error of data, and two types of HARQ are defined according to retransmission timing of data as follows.

FIG. 16 illustrates an example of asynchronous HARQ operation in downlink.

Referring to FIG. 16, when transmitting retransmission data, an eNB that receives NACK transmits the data by setting NDI in a DL grant (DCI format 1) as a bit that represents a retransmission. In this case, the NDI includes HARQ process ID, and represents which data is retransmitted.

FIG. 17 illustrates an example of synchronous HARQ operation in downlink.

Referring to FIG. 17, an eNB that transmits NACK transmits retransmission data with the same resource as an initial data transmission by allocating data resource for retransmission to a new resource by setting NDI in a DL grant (DCI format 1) as a bit that represents a retransmission, or omitting a UL grant. In this case, the retransmission timing is always fixed at the subframe after 4 ms when receiving NACK.

The HARQ scheme tries to correct error for a received code basically, and determines whether to retransmit it by using simple error detection code such as Cyclic Redundancy Check (CRC). For a retransmission, the HARQ scheme is divided into three types as follows, and LTE performs the HARQ scheme through CC (second technique) or IR (third technique).

1) Type-I HARQ Scheme: A receiver discards a packet having an error and requests for retransmission, and a transmitter transmits the packet which is the same as that of an initial transmission. By discarding a packet having an error, an increase in reliability of a system and a performance increase through FEC are obtained.

2) Type-I HARQ Scheme with Chase Combining: This is a technique, instead of discarding a packet having an error, of using the packet by combining it with a retransmitted packet. By combining several packets, an effect of increasing signal power may be obtained, consequently.

3) Type-II HARQ Scheme (Incremental redundancy Scheme): This is a technique of using a code of high code rate in an initial transmission and transmitting an additional redundancy when a retransmission occurs in order to prevent the case of transmitting a code of high redundancy in an initial transmission unnecessarily in the case of Type-I.

PHICH(Physical HARQ Indication Channel)

A PHICH is described below.

In the LTE system, since SU-MIMO is not supported in uplink, one PHICH transmits only the PUSCH of one UE, that is, 1-bit ACK/NACK for a single stream.

The 1-bit ACK/NACK is coded into three bits using a repetition code whose code rate is 1/3. Three modulation symbols are generated by modulating the coded ACK/NACK according to a binary phase key-shifting (BPSK) method. The modulation symbol is spread using a spreading factor (SF)=4 in a normal CP structure and using SF=2 in an extended CP structure.

When the modulation symbols are spread, an orthogonal sequence is used. The number of orthogonal sequences used becomes SF*2 in order to apply I/Q multiplexing.

PHICHs spread using the SF*2 orthogonal sequence may be defined as one PHICH group. Layer mapping is performed on the spread symbols. The layer-mapped symbols are subjected to resource mapping and transmitted.

A PHICH transmits HARQ ACK/NACK according to PUSCH transmission.

A plurality of PHICHs mapped to the resource elements of the same set forms a PHICH group. The PHICHs within the PHICH group are distinguished by different orthogonal sequences. In the FDD system, $n_{PHICH}^{group}$ that is the number of PHICH groups is constant in all of subframes, and may be determined by Equation 1.

$$N_{PHICH}^{group} = \begin{cases} \lceil N_g(N_{RB}^{DL}/8) \rceil, & \text{for normal cyclic prefix} \\ 2 \times \lceil N_g(N_{RB}^{DL}/8) \rceil, & \text{for extended cyclic prefix} \end{cases} \quad \text{[Equation 1]}$$

In Equation 1, Ng is transmitted in a higher layer through a physical broadcast channel (PBCH), and $Ng \in \{1/6, 1/2, 1, 2\}$. The PBCH carries system information that is essential for a UE to communicate with an eNB. System information transmitted through the PBCH is called a master information block (MIB).

In contrast, system information transmitted through a physical downlink control channel (PDCCH) is called a system information block (SIB). $N_{RB}^{DL}$ is a downlink bandwidth configuration expressed by a multiplication of $N_{SC}^{RB}$, that is, the size of a resource block in the frequency domain. A PHICH group index $n_{PHICH}^{group}$ is any one integer of 0 to $n_{PHICH}^{group}-1$.

Resources used for a PHICH may be determined based on the smallest PRB index when the resources of a PUSCH are allocated and the cyclic shift value of a demodulation reference signal (DMRS) transmitted in an uplink (UL) grant.

Resources to which a PHICH is mapped (hereinafter referred to as "PHICH resources") may be expressed as $(n_{PHICH}^{group}, n_{PHICH}^{seq})$, that is, an index pair. $n_{PHICH}^{group}$ indicates a PHICH group index, and $n_{PHICH}^{seq}$ indicates an orthogonal sequence index within the PHICH group. The $(n_{PHICH}^{group}, n_{PHICH}^{seq})$ may be determined by Equation 2 below.

$$n_{PHICH}^{group} = (I_{PRB_{RA}} + n_{DMRS}) \bmod N_{PHICH}^{group} + I_{PHICH} N_{PHICH}^{group},$$

$$n_{PHICH}^{seq} = (\lfloor I_{PRB\_RA}/N_{PHICH}^{group} \rfloor + n_{DRMS}) \bmod 2N_{SF}^{PHICH}$$ [Equation 2]

In Equation 2, the nDMRS is mapped from a cyclic shift for a demodulation reference signal (DMRS) field in the most recent PDCCH having an uplink DCI format for a transport block, which is related to the transmission of a corresponding PUSCH.

In contrast, if a PDCCH having an uplink DCI format for the same transport block is not present, an initial PUSCH for the same transport block is scheduled semi-persistently or when the initial PUSCH is scheduled by a random access response approval signal, the nDMRS is set to 0.

$N_{SF}^{PHICH}$ indicates a spreading factor size used for PHICH modulation.

$I_{PRB\_RA}$ is the same as $I_{PRB\_RA}^{lowest\_index}$ if it i, the first transport block of a PUSCH related to a PDCCH or if the number of transport blocks manually recognized when a related PDCCH is not present is not the same as the number of transport blocks indicated in the most recent PDCCH related to the corresponding PUSCH.

In contrast, if it is the second transport block of a PUSCH related to the PDCCH, it is the same as $I_{PRB\_R}^{lowest\_index}+1$. In this case $I_{PRB\_RA}^{lowest\_index}$ corresponds to the lowest PRB index of the first slot of the transmission of the corresponding PUSCH.

$n_{PHICH}^{group}$ indicates the number of PHICH groups configured by a higher layer.

$I_{PHICH}$ has "1" if a PUSCH is transmitted in a subframe index 4 or 9 and "0" if not in the uplink-downlink configuration 0 of a TDD system.

Table 5 shows a mapping relation between a cyclic shift for a DMRS field used to determine PHICH resources in a PDCCH having an uplink DCI format and an nDMRS.

TABLE 5

| Cyclic Shift for DMRS Field in PDCCH with uplink DCI format | nDMRS |
|---|---|
| 000 | 0 |
| 001 | 1 |
| 010 | 2 |
| 011 | 3 |
| 100 | 4 |
| 101 | 5 |

TABLE 5-continued

| Cyclic Shift for DMRS Field in PDCCH with uplink DCI format | nDMRS |
|---|---|
| 110 | 6 |
| 111 | 7 |

DCI Format 0 (UL Grant) in LTE/LTE-A System

FIG. 18 is a diagram illustrating an example of DCI format 0.

In LTE a PUSCH resource is allocated through a UL grant of an eNB.

By transmitting DCI format 0 CRC masked by C-RNTI of a UE through a PDCCH, the LTE UL grant makes a UE to generate uplink data and transmit it according to an instruction of an eNB through receiving the corresponding information.

That is, FIG. 18 and Table 6 represent parameters of DCI format 0.

TABLE 6

| Format 0(release 8) | Format 0(release 8) |
|---|---|
|  | Carrier Indicator |
| Flag for format 1A differentiation | Flag for format 0/format 1A differentiation |
| Hopping flag | Hopping flag |
| Resource block assignment(RIV) | Resource block assignment(RIV) |
| MCS and RV | MCS and RV |
| NDI(New Data Indicator) | NDI(New Data Indicator) |
| TPC for PUSCH | TPC for PUSCH |
| Cyclic Shift for DM RS | Cyclic Shift for DM RS |
| UL index(TDD only) | UL index(TDD only) |
| Downlink Assignment Index(DAI) | Downlink Assignment Index(DAI) |
| CQI request(1 bit) | CSI request(1 or 2 bits: 2 bits are multi carrier) |
|  | SRS request |
|  | Resource allocation type |

Herein, the lengths of Hopping flag and RIV may have different lengths according to a system bandwidth as follows.

Hopping Flag
: 1 (1.4/3/5 Mhz) or 2 (10/15/20 Mhz) bits
Resource Block Assignment
: 5 (1.4 Mhz), 7 (3/5 Mhz), 11 (10 Mhz), 12 (15 Mhz), 13 (20 Mhz) bits A UL data transmission method in LTE (-A) or 802.16m is briefly described.

The cellular system such as LTE (-A) or 802.16m uses a resource allocation scheme based on an eNB scheduling.

In the system that uses the resource allocation scheme based on an eNB scheduling as such, a UE that has data to transmit (i.e., UL data) requests a resource for transmitting the corresponding data to an eNB before transmitting the data.

The scheduling request of a UE may be performed through a Scheduling Request (SR) transmission to a PUCCH or a Buffer Status Report (BSR) transmission to a PUSCH.

In addition, in the case that a resource for transmitting the SR or the BSR is not allocated to a UE, the UE may request an uplink resource to an eNB through the RACH procedure.

As such, an eNB that receives the scheduling request from a UE allocates the uplink resource that the corresponding UE is going to use to the UE through a downlink control channel (i.e., UL grant message, DCI in the case of LTE (-A)).

In this case, the UL grant transmitted to the UE may indicate which subframe the resource that is allocated to the UE corresponds to by explicit signaling, but may also define an appointed time between the UE and the eNB using the resource allocation for the subframe after a specific time (e.g., 4 ms in the case of LTE).

As such, the case that an eNB allocates a resource after X ms (e.g., 4 ms in the case of LTE) to a UE means that the eNB allocates the resource of UE by considering all of the times for receiving and decoding a UL grant and for preparing and encoding the data to transmit.

DCI Format 3/3A in LTE/LTE-A System

In the case of LTE(-A), DCI format 3/3A may be used for a power control of a PUCCH or a PUSCH.

DCI format 3/3A may be constructed by N TPC commands as represented in Table 7 or Table 8 below.

Here, N may be preconfigured to a UE through an RRC message. Such DCI format 3/3A may transmit information of 2N/N bits length, and is transmitted through a common search space by being CRC masked with TPC-RNTI.

A UE performs a power control for transmitting data to a PUCCH or a PUSCH by receiving a TPC command that corresponds to its own location.

TABLE 7

Format 3(release 8) - TPC-RNTI

| Field Name | Length(Bits) | Comment |
| --- | --- | --- |
| TPC command number 1 | 2 | |
| TPC command number 2 | 2 | |
| TPC command number 3 | 2 | |
| ... | | |
| TPC command number N | 2 | The size of N is dependent on the payload size of DCI format 0 for the system BW |

TABLE 8

Format 3A(release 8) - TPC-RNTI

| Field Name | Length(Bits) | Comment |
| --- | --- | --- |
| TPC command number 1 | 1 | |
| TPC command number 2 | 1 | |
| TPC command number 3 | 1 | |
| ... | | |
| TPC command number N | 1 | The size of N is dependent on the payload size of DCI format 0 for the system BW |

Hereinafter, a procedure for an eNB to send down a PDCCH to a UE will be described.

FIG. 19 is a block diagram illustrating a structure of a PDCCH.

A BS determines a PDCCH format according to DCI to be transmitted to a UE, attaches a CRC to control information, and masks a unique identifier (referred to as a radio network temporary identifier (RNTI)) to the CRC according to an owner or usage of the PDCCH (block 1910).

In the case that the PDCCH is for a specific wireless device, a unique identifier (e.g., cell-RNTI (C-RNTI)) of the UE may be masked to the CRC.

Alternatively, in the case that the PDCCH is for a paging message, a paging indication identifier (e.g., paging-RNTI (P-RNTI)) may be masked to the CRC.

In the case that the PDCCH is for system information, a system information identifier (e.g., system information-RNTI (SI-RNTI)) may be masked to the CRC. In order to indicate a random access response that is a response for transmission of a random access preamble of the UE, a random access-RNTI (RA-RNTI) may be masked to the CRC. In order to indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 1920).

Encoding includes channel encoding and rate matching.

The encoded data is modulated to generate modulation symbols (block 1930).

The modulation symbols are mapped to physical resource elements (REs) (block 1940). The modulation symbols are respectively mapped to the REs.

FIG. 20 illustrates an example of resource mapping of a PDCCH.

Referring to FIG. 20, R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REG includes a plurality of resource elements (REs). According to the relationship between the number of CCEs and the coding rate provided by the CCEs, a PDCCH format and a possible PDCCH bit number are determined.

One REG (indicated by a quadruplet in the drawing) includes 4 REs. One CCE includes 9 REGs.

The number of CCEs used to configure one PDCCH may be selected from $\{1, 2, 4, 8\}$. Each element of $\{1, 2, 4, 8\}$ is referred to as a CCE aggregation level.

A control channel including one or more CCEs performs interleaving in unit of REG, and is mapped to a physical resource after performing cyclic shift based on a cell identifier (ID).

FIG. 21 illustrates an example of distributing CCEs across a system band.

Referring to FIG. 21, a plurality of logically contiguous CCEs is input to an interleaver. The interleaver permutes the sequence of the plurality of input CCEs on an REG basis.

Accordingly, the time/frequency resources of one CCE are physically distributed to a total time/frequency area in the control region of a subframe. As a consequence, while the control channel is configured on a CCE basis, it is interleaved on an REG basis, thereby maximizing frequency diversity and an interference randomization gain.

FIG. 22 illustrates an example of PDCCH monitoring.

In 3GPP LTE, blind decoding is used to detect a PDCCH. Blind decoding is a process of de-masking a cyclic redundancy check (CRC) of a received PDCCH (PDCCH candidate) with a desired identifier to check a CRC error, thereby allowing a UE to identify whether the PDCCH is a control channel of the UE. A UE does not recognize a position in which a PDCCH thereof is transmitted in a control region and a CCE aggregation level or DCI format used to transmit the PDCCH.

A plurality of PDCCHs may be transmitted in one subframe. A UE monitors a plurality of PDCCHs in each subframe.

Here, the monitoring refers to an attempt of a UE to decode a PDCCH according to a monitored PDCCH format.

In 3GPP LTE, a search space is used to reduce load caused by blind decoding. A search space may denote a monitoring set of CCEs for a PDCCH. A UE monitors a PDCCH in a corresponding search space.

A search space is divided into a common search space and a UE-specific search space. The common search space is a space for searching for a PDCCH having common control information, which includes 16 CCEs with CCE indexes of 0 to 15 and supports a PDCCH having a CCE aggregation level of {4, 8}. However, a PDCCH (DCI format 0 and 1A) carrying UE-specific information may also be transmitted to the common search space. The UE-specific search space supports a PDCCH having a CCE aggregation level of {1, 2, 4, 8}.

TABLE 9

| Search Space Type | Aggregation Level(L) | Size (in CCEs) | Number of PDCCH candidates | DCI formats |
|---|---|---|---|---|
| UE-Specific | 1 | 6 | 6 | 0, 1, 1A, 1B, 1C, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of a search space is determined by Table 9 above, and a different start point of a search space is defined for a common search space and a UE-specific search space. A start point of a common search space is fixed regardless of subframes, while a start point of a UE-specific search space may change by subframe according to an UE ID (e.g., C-RNTI), a CCE aggregation level and/or a slot number in a radio frame. When the start point of the UE-specific search space is in the common search space, the UE-specific search space and the common search space may overlap.

In an aggregation level of $L \in \{1, 2, 4, 8\}$, a search space $S^{(L)}_k$ is defined as an aggregation of PDCCH candidates. A CCE that corresponds to PDCCH candidate m of a search space $S^{(L)}_k$ is given as below.

$$L \cdot \left\{ (Y_k + m) \bmod \left\lfloor \frac{N_{CCE,k}}{L} \right\rfloor \right\} + i \quad \text{[Equation 4]}$$

Here, $i=0, 1, \ldots, L-1, m=0, \ldots M^{(L)}-1$, $N_{CCE,k}$ are total number of a CCE that may be used for a transmission of a PDCCH in a control region of subframe k.

A control region includes an aggregation of CCEs numbered from 0 to $N_{CCE,k}-1$. $M^{(L)}$ is the number of PDCCH candidates in CCE aggregation level L in a given search space. In a common search space, $Y_k$ is set to 0 with respect to two aggregation levels, L=4 and L=8. In a UE-specific search space of aggregation level L, variable $Y_k$ is defined as below.

$$Y_k = (Q \cdot Y_{k-1}) \bmod D \quad \text{[Equation 5]}$$

Here, $Y_{-1} = n_{RNTI} \neq 0$, A=39827, D=65537, k=floor($n_s/2$) and $n_s$ are slot number in a radio frame.

FIG. 23 is a diagram illustrating an example of a logical channel prioritization in the LTE system.

First, data transmitted and received between a UE and an eNB may generate different Data Radio Bearer (DRB) with each other according to a service property, and each DRB may be mapped to a specific Dedicated Traffic Channel (DTCH).

Here, the DRB of LTE may be generated up to maximum 32, and accordingly, DRB IDs may be allocated with values from 1 to 32.

In addition, the DRB transmitted to a DTCH may be mapped to logical channel IDs (LCIDs) from 3 to 10, and a DRB ID may be mapped to an LCID for a DTCH.

Furthermore, maximum 8 DTCHs that may be generated in LTE may be mapped to a logical channel group (LCG) depending on a service type of a DRB, and this means that an LCID for one or more DTCHs may be mapped to an LCG ID.

Here, an LCG ID is a unit that a UE reports a Buffer Status to an eNB.

The data transmitted to a DTCH logical channel is mapped to a downlink share channel (DL-SCH) or an uplink share channel (UL-SCH) of a MAC layer, and this is transmitted by being mapped to a PDSCH or a PUSCH of a PHY layer, respectively.

In this case, a MAC layer may transmit the data generated from different DTCH logical channel that may be transmitted and received to a specific UE by multiplexing it with a single physical resource.

According to it, multiplexed data are constructed as a single transport block and transmitted in the same resource, and the same HARQ process is performed.

LTE provides the logical channel prioritization function that a UE may transmit data having high priority more quickly by providing a priority for a logical channel with respect to an UL data of the UE.

This set a Prioritized Bit Rate (PBR) for each logical channel in order to prevent the starvation phenomenon of data transmitted from a logical channel of which priority is low, and accordingly, data of which priority is high can be transmitted using a resource of higher ratio.

As shown in FIG. 23, data of a specific DRB is mapped to a single logical channel, and has a PRB according to the priority. After data as much as the PRB which is set is allocated to a resource according to the priority, the data is transmitted by applying all of the allocated resources.

In this case, the data generated from an SRB may have a PRB infinity value, and this is designed for transmitting all of the data that are intended to be transmitted at a time by using the allocated resources.

CRC Calculation in LTE/LTE-A

Currently, in LTE(-A), as a method for detecting an error of data, CRC is attached to a transport block and transmitted.

It is defined that 16-bit CRC is used by using an RNTI identifier for error detection in a PDCCH and 24-bit CRC is used for a data transmission.

More specifically, it is defined that CRC of CRC24A type is used for TB CRC and CRC of CRC24B type is used for code block CRC.

FIG. 24 illustrates an example of a signal processing procedure of a UL shared channel which is a transport channel in a wireless communication system to which the present invention may be applied.

Hereinafter, the signal processing procedure of the UL shared channel (hereinafter, "UL-SCH") may be applied to one or more transport channels or control channel types.

Referring to FIG. 24, a UL-SCH forwards data to a coding unit in a form of Transport Block (TB) once in every transmission time interval (TTI).

CRC parity bits $p_0, p_1, p_2, p_3, \ldots, p_{L-1}$ are attached to bits $a_0, a_1, a_2, a_3, \ldots, a_{A-1}$ of a transport block forwarded from a higher layer (step, S120). In this case, A is the size of the transport block and L is the number of parity bits.

The parity bits are generated by one of the following cyclic generator polynomials.

$$gCRC24A(D) = [D24 + D23 + D18 + D17 + D14 +$$
$$D11 + D10 + D7 + D6 + D5 + D4 + D3 + D + 1] \text{ and;}$$
$$gCRC24B(D) = [D24 + D23 + D6 + D5 + D + 1]$$
for a CRC length $L = 24$ and;
$$gCRC16(D) = [D16 + D12 + D5 + 1] \text{ for a CRC length } L = 16.$$
$$gCRC8(D) = [D8 + D7 + D4 + D3 + D + 1] \text{ for a CRC length of } L = 8.$$

The input bit to which CRC is attached is as represented as $b_0, b_1, b_2, b_3, \ldots, b_{B-1}$. In this case, B represents a bit number of a transport block including CRC.

$b_0, b_1, b_2, b_3, \ldots, b_{B-1}$ is segmented into several code blocks (CB) depending on a TB size, and CRC is attached to the segmented several CBs (step, S121).

After the code block segmentation and CRC attachment, a bit is as represented as $c_{r0}, c_{r1}, c_{r2}, c_{r3}, \ldots, c_{r(K_r-1)}$. Herein, r is the number ($r=0, \ldots, C-1$) of a code block, and Kr is a bit number according to r.

Subsequently, channel coding is performed (step, S122). A output bit after the channel coding is as represented as $d_{r0}^{(i)}, d_{r1}^{(i)}, d_{r2}^{(i)}, d_{r2}^{(i)}, d_{r3}^{(i)}, \ldots, d_{r(D_r-1)}^{(i)}$. In this case, i is a stream index which is coded, and may have a value of 0, 1 or 2. Dr represents a bit number of ith coded stream for code block r. r is the number ($r=0, \ldots, C-1$) of a code block, and C represents total number of code blocks. Each code block may be coded by turbo coding, respectively.

Subsequently, rate matching is performed (step, S123). After going through the rate matching, the bit is as represented as $e_{r0}, e_{r1}, e_{r2}, e_{r3}, \ldots, e_{r(E_r-1)}$. In this case, r is the number ($r=0, \ldots, C-1$) of a code block, and C represents total number of code blocks. Er represents the number of bits which are rate matching of rth code block.

Subsequently, a concatenation between code blocks is performed again (step, S124). After the concatenation of performed, the bit is as represented as $f_0, f_1, f_2, f_3, \ldots, f_{G-1}$. In this case, G represents total number of coded bits for a transmission. When control information is multiplexed with a UL-SCH transmission, the bit number used for control information transmission is not included.

Meanwhile, when control information is transmitted in a PUSCH, channel coding is independently performed for each of CQI/PMI, RI, ACK/NACK that are control information (steps, S126, S127 and S128). Since different coded symbols are allocated for each type of the control information, each of the types of the control information has different coding rates.

In Time Division Duplex (TDD), two types of modes, ACK/NACK bundling and ACK/NACK multiplexing, are supported by higher layer configuration as ACK/NACK feedback mode. For the ACK/NACK bundling, ACK/NACK information bit is configured by 1 bit or 2 bits, and for the ACK/NACK multiplexing, ACK/NACK information bit is configured by 1 bit to 4 bits.

In step S124, after the step of concatenation between code blocks, multiplexing of the coded bits $f_0, f_1, f_2, f_3, \ldots, f_{G-1}$ of UL-SCH data and the coded bits $q_0, q_1, q_2, q_3, \ldots, q_{N_L \cdot Q_{CQI}-1}$ of CQI/PMI is performed (step, S125). A result of multiplexing of data and CQI/PMI is as represented as $g_0, g_1, g_2, g_3, \ldots, g_{H'-1}$. In this case, $g_i (i=0, \ldots, H'-1)$ represents a column vector having a length of $(Q_m \cdot N_L)$. Herein, $H=(G+N_L \cdot Q_{CQI})$ and $H'=H/(Q_m \cdot N_L)$. NL represent the number of layer in which a UL-SCH transport block is mapped, and H represents the number of total coded bits which is allocated for UL-SCH data and the CQI/PMI information to NL transport layers to which a transport block is mapped.

Subsequently, the multiplexed data, CQI/PIM, separately channel coded RI and ACK/NACK are channel-interleaved, and an output signal is generated (step, S129).

As shown in FIG. 24, TB of a predetermined length or longer may be segmented, and the segmented block is called a code block. That is, TB of a predetermined length or shorter is transmitted in which only TB CRC (CRC24A) is attached, but in the TB of a predetermined length or longer, TB to which TB CRC (CRC24B) is attached is segmented again, and transmitted by attaching code block CRC (CRC24B) to each code block.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system may be mainly categorized into two types. In particular, there are a reference signal for the purpose of channel information acquisition and a reference signal used for data demodulation. Since the object of the former reference signal is to enable a UE to acquire channel information in DL, the former reference signal should be transmitted on broadband. And, even in the case that the UE does not receive DL data in a specific subframe, it should perform a channel measurement by receiving the corresponding reference signal. Moreover, the corresponding reference signal is used for a measurement for mobility management of a handover or the like. The latter reference signal is the reference signal transmitted together when a base station transmits downlink data, and the UE may perform channel estimation by receiving the corresponding reference signal, thereby demodulating data. The corresponding reference signal should be transmitted in a data transmitted region.

The DL reference signals are categorized into a common reference signal (CRS) shared by all UEs for an acquisition of information on a channel state and a measurement associated with a handover or the like and a dedicated reference signal (DRS) used for a data demodulation for p specific UE. Information for demodulation and channel measurement may be provided by using the reference signals. That is, the DRS is used only for data demodulation only, while the CRS is used for two kinds of purposes including channel information acquisition and data demodulation.

The receiver side (that is, UE) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feedback of channel state information (CSI) may be defined as CSI-RS.

The DRS may be transmitted through resource elements when data demodulation on the PDSCH is required. The UE may receive whether the DRS is present through the upper layer and is valid only when the corresponding PDSCH is mapped. The DRS may be referred to as the UE-specific RS or the demodulation RS (DMRS).

FIG. 25 illustrates a reference signal pattern mapped to a downlink resource block pair in the wireless communication system to which the present invention may be applied.

Referring to FIG. 25, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (the case of FIG. 25(*a*)) and a length of 12 OFDM symbols in the case of an extended cyclic prefix (CP) (the case of FIG. 25(*b*)).

Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

FIG. 26 is a diagram illustrating a time until a UE transmits actual data through 5 step scheduling request procedure using PUCCH SR resource.

As shown in FIG. 26, a UE may transmit actual uplink data after about 17 ms from the time of transmitting an SR signal.

In this case, the SR resource allocated to the UE may be allocated to a PUCCH with a specific period, minimum 1 ms to maximum 80 ms.

Here, in the case that the SR of 1 ms period is allocated to the corresponding UE, an average time for the UE to wait for the PUCCH resource for an SR transmission is 0.5 ms, and the delay time until the data transmission through a scheduling request to an eNB takes 17.5 ms.

In the case that a UE has an uplink resource allocated from an eNB beforehand, the UE may transmit the resource request for newly generated data by using the resource allocated beforehand.

Alternately, the UE may request an additional resource by transmitting a BSR together with the data transmitted with the resource allocated beforehand.

In this case, as shown in FIG. 27, the delay of 9 ms occurs until transmitting uplink data after a UE request a BSR.

In the case that there is no PUCCH SR resource or PUSCH resource that the UE is allocated from the eNB or the uplink is not synchronized, the UE may request the resource for the newly generated data using the RACH procedure.

That is, as shown in FIG. 28, the delay of 17 ms occurs until the UE transmits uplink data from the time of transmitting the RACH preamble to the eNB.

In this case, the PRACH resource that is available to transmit the RACH preamble may be configured with a specific period for each cell. Assuming the PRACH resource has the period of minimum 1 ms, the data transmission delay of average 17.5 ms may occur.

As described in FIG. 26 to FIG. 28, the UE may transmit actual data by undergoing the delay of minimum 9 ms to maximum 17.5 ms for transmitting uplink data.

Accordingly, the eNB allocates an optimal resource to each UE in a channel environment, and accordingly, the resource efficiency may be maximized, but the transmission delay occurs.

The requirement of 5G is increasing for supporting various real time application services such as health care, traffic safety, disaster safety, remote medical control, and so on.

Accordingly, 5G sets it as a goal to construct an ultra low latency system that has an extremely short response time to the extent that a user is unable to notice even in the case that the tactility information which is mostly sensitive to the delay time among five senses of a human is provided through an internet (target delay: E2E or Radio 1 ms).

Particularly, it is anticipated that 5G has a frame structure having a physical transmission unit (shorter TTI) of a length shorter than the current LTE(-A) for the purpose of user-plane latency of 1 ms.

In order to attain radio latency of 1 ms, shorter TTI that a TTI unit has 1 symbol length and the like in a slot unit has been considered.

In addition, in the service that requires the ultra low latency, a scenario that requires highly reliable data transmission as well as the latency are considered together, and it is required that the latency for retransmission is also minimized together.

However, since such a short TTI structure enables data to be transmitted with a time resource of a unit which is smaller than conventional 1 ms TTI, a problem occurs that overhead for control information increases so much.

For example, in the case of assuming that 7 short TTIs of 2 symbol length are existed in 1 ms TTI and the entire control information transmitted in the conventional PDCCH is transmitted in each short TTI, in the short TTI structure, the control information of about seven times in comparison with the conventional case is needed to be transmitted.

However, the short TTI structure has a problem that overhead of a PDCCH increases in comparison with a PDSCH as other resource space decreases as the control information increases, in comparison with the conventional case.

Owing to such a reason, in 5G system, it is further required a technique for decreasing overhead of a DL control information transmission.

Hereinafter, a DL data retransmission method will be described for supporting a new 5G low latency service proposed in the present disclosure.

Particularly, the present disclosure provides a DL data retransmission method of non-adaptive HARQ scheme in which DL retransmission data may be retransmitted by using the resource information used in a previous data transmission without any change in order to minimize overhead of a DL control information transmission in 5G system in which the short TTI structure may be used.

This means that the next retransmission data may be received by using resource information of the previous DL grant for receiving retransmission data for data that corresponds to a PID (HARQ Process ID) on which NACK is transmitted.

In the case that it operates in synchronous HARQ, retransmission data may be received by using the same resource information as the resource of the previous data reception without a DL grant in a determined time resource.

In the case that it operates in asynchronous HARQ, a UE may receive retransmission data through a simple DL grant reception in which specific resource information (e.g., RAH (Resource Allocation Header), resource block assignment, MCS, TPC information, etc.) is omitted.

FIG. 29 is a main diagram of a downlink HARQ operation proposed in the present disclosure. Particularly, FIG. 29a shows an example of synchronous DL HARQ, and FIG. 29b shows an example of asynchronous DL HARQ.

As shown in FIG. 29a, in the case of the synchronous DL HARQ, a UE receives DL retransmission data after a predetermined time from NACK transmission time from an eNB without any separate DL grant from the eNB.

As shown in FIG. 29b, in the case of the asynchronous DL HARQ, a UE receives the simple DL grant from the eNB, and receives DL retransmission data based on it from the eNB.

The method of performing non-adaptive DL HARQ proposed in the present disclosure may use the various methods as enumerated below.

1. Method of Omitting DL Control Information in PDCCH: Applied in the Synchronous HARQ
(1) Method of retransmitting DL data through DL grant omission
(2) Method of multiplexing DL-SCH data in a PDSCH resource and non-adaptive HARQ indicator
2. Method of Transmitting DL Control Information Through PDCCH: Applied in the Asynchronous HARQ
(1) Definition of simple DL grant using down-level CCE of a UE-specific Search Space
(2) Definition of a new DCI format for a non-adaptive retransmission indicator through a Common Search Space
(3) Definition of a new physical channel (e.g., PRICH, Physical Retransmission Indicator CHannel)

As mentioned above, the present invention relates to a method for decreasing overhead for a DL physical control information transmission, and proposes to apply the non-adaptive HARQ scheme for DL retransmission data.

The DL HARQ of the conventional LTE(-A) operates based on the asynchronous HARQ scheme or the adaptive HARQ scheme.

However, when a frame structure to which short TTI is applied is introduced as one of the technique for supporting low latency service in a next 5G system, the overhead problem for a DL control information transmission may occur.

Accordingly, it is required to modify the DL HARQ operation in the conventional LTE(-A).

Since a ratio of a control channel increases in comparison with a shared channel in the short TTI frame structure, when the short TTI frame structure is applied, it has been considered as one of big issues to decrease overhead for a control information transmission.

As one of the methods for solving the overhead problem in a DL control information transmission, the synchronous HARQ may be considered.

Accordingly, the present disclosure provides a method that enables the non-adaptive HARQ to be performed by considering both of the synchronous scheme and the asynchronous scheme as the DL HARQ scheme.

In addition, when an eNB retransmits DL data in the non-adaptive scheme to a UE, since it is designed that the DL data is retransmitted by using the same resource for the channel on which an initial DL data transmission is failed, it causes the same data transmission failure.

Accordingly, in order to solve the problem, in the present disclosure, frequency resource used is differently allocated in each DL data retransmission, and diversity effect may be obtained.

That is, as represented in Equation 6 below, frequency hopping/shift pattern is newly defined for a retransmission data resource, a method of retransmitting DL data is provided.

$$\text{Lowest } PRB \text{ index}_{(i+1)^{th}data} = (\text{Lowest } PRB \text{ index}_{i}{}^{th}{}_{data} + \text{Shift}_n)\%N_{RB} \quad \text{[Equation 6]}$$

Herein, i is an integer value satisfying the condition $1 \leq i \leq n$, n means a maximum HARQ retransmission count, and i=1 means an initial data transmission.

In addition, $\text{shift}_n$ may be an integer value satisfying the condition $0 \leq \text{shift}_n \leq N_{RB}-1$, and $N_{RB}$ is an RB number that may be set depending on a bandwidth, and may be set depending on a system. % denotes a modulo operation symbol.

Equation 6 above may be applied to all of the methods (method 1 and method 2) proposed in the present disclosure that will be described below.

FIG. 30 is a diagram illustrating an example of a method for retransmitting DL data in non-adaptive HARQ scheme by using frequency hopping and shift pattern proposed in the present disclosure.

FIG. 30 shows a frequency shift method of the case that initial data transmitted in $0^{th}$ subframe is retransmitted in a period of 8 ms.

In addition, FIG. 30 shows the case that a shift number is '2' in 1.4 MHz bandwidth in which RB number is 6.

As shown in FIG. 30, a resource is allocated such that DL data is transmitted in a resource region which is shifted by '2' in a resource (PRB) index used for the previous transmission whenever the DL data is retransmitted to a UE.

In the case that DL HARQ operates in the non-adaptive scheme and uses the method shown in FIG. 30 that frequency is shifted in each retransmission, an eNB allocates the next retransmission data transport resource of the UE that receives NACK to the resource for the resource region in the shifted position by using the corresponding shift value.

Here, it is assumed that a frequency hopping pattern or a shift number is shared between the UE and the eNB in advance through a specific signaling (e.g., RRC/MAC message or physical control channel, etc.).

FIG. 30 and Equation 6 are examples of the frequency hopping pattern method proposed in the present disclosure, and various frequency hopping patterns and shift values may be applied depending on a system performance.

Method 1: Non-Adaptive DL HARQ Method Through DL Grant Omission (for Synchronous HARQ)

Method 1 relates to a method of retransmitting DL data by omitting a transmission of a DL grant in order to minimize overhead of a DL control information transmission.

It is assumed that method 1 uses the synchronous HARQ for DL data.

The synchronous HARQ is one of the methods that may be used to minimize the DL control information, and may have a problem that flexibility for retransmission resource scheduling is degraded in comparison with the asynchronous technique, but is one of the technique that may be used to minimize the control information when overhead of DL control information is a big issue like the short TTI.

Largely, method 1 may be divided into (1) a method of retransmitting data through DL grant omission and (2) a method of multiplexing DL-SCH data in a PDSCH resource and non-adaptive HARQ indicator.

Method 1-1: Method of Retransmitting Data Through DL Grant Omission

The DL grant omission method proposed in method 1-1 is a method of retransmitting only data by using the resource allocated in an initial transmission, not transmitting any DL grant and DL control information as shown in FIG. 31.

FIG. 31 is a diagram illustrating an example of a data retransmission method through DL grant omission proposed in the present disclosure.

Referring to FIG. 31, an eNB transmits initial data together with a DL grant to a UE (step, S3110).

When the UE fails to receive the DL initial data transmitted from the eNB, the UE transmits NACK to the eNB (step, S3120).

In response to the NACK, the eNB performs a retransmission for the DL initial data to the UE.

In this case, the eNB retransmits the DL initial data without any separate DL grant to the UE in an SF after a specific time (e.g., 4 sub-frame) by using the synchronous HARQ technique (step, S3130).

At this time, the UE may obtain the resource information for the retransmission data by using the resource information received (in step S3110) from the previous DL grant.

The eNB transmits the retransmission data for the DL initial data through the resource region on which the DL initial data was transmitted to the UE without transmission of the DL control information for a retransmission.

However, in method 1-1, in the case that the eNB wrongly detect the feedback of the UE as 'ACK' instead of NACK owing to 'NACK to ACK error', although the UE receives new data (not retransmission data) in the previous DL grant resource region without any indication, the UE performs HARQ combining of the new data with the previous data, and accordingly, the UE causes a problem of transmitting NACK continuously.

In the case that the UE transmits new data for another UE using the corresponding resource region, the feedback for DL data received by another UE causes feedback collision with the UE that causes the NACK to ACK error.

In addition, since the eNB is a subject of scheduling, due to some reason, the eNB may transmit other data in the resource region for transmitting retransmission data, and accordingly, a problem may occur that the UE is unable to receive the retransmission data properly from the eNB.

Method 1-2: Method of Multiplexing DL-SCH Data in a PDSCH Resource and Non-Adaptive HARQ Indicator In order to the problem that may occur in method 1-1 described above, method 1-2 proposes a method of transmitting an indicator in relation to a specific retransmission together with retransmission data.

That is, the indicator is newly defined as below.

The indicator used below means an indicator indicating whether the data transmitted to a UE is retransmission data or not, and may also represented as non-adaptive HARQ indicator.

That is, method 1-2 relates to a method of transmitting the non-adaptive HARQ indicator, for DL-SCH data transmitted without a specific DL grant, indicating that the corresponding data is data retransmitted without a DL grant owing to the non-adaptive HARQ, together with retransmission data.

Particularly, in method 1-2, the non-adaptive HARQ indicator is defined to be transmitted through multiplexing with DL-SCH data in a PDSCH resource.

Method 1-2 is a method that may be applied in the case that DL HARQ operates in the synchronous HARQ, and defines that the non-adaptive HARQ indicator is transmitted in an RE in a specific position of a resource in which DL data is transmitted.

Here, in the case that the resource region allocated for DL data includes one or more RBs, the resource on which the non-adaptive HARQ indicator is transmitted may also defined as an RB in one or more fixed positions in the allocated resource region.

For example, the resource on which the non-adaptive HARQ indicator is transmitted may also defined as n number of RB(s) that has the lowest or the highest PRB index.

Here, n may have a range from 1 to RB number which is allocated.

FIG. 32 is a diagram illustrating an example of a method for multiplexing DL retransmission data in a PDSCH resource and a non-adaptive HARQ indicator proposed in the present disclosure.

As shown in FIG. 32, the resource element (RE) in which the non-adaptive HARQ indicator is transmitted in a specific RB is defined as an RB that may be allocated to a reference signal (RS) and the existing PDSCH data region except the RE for a PDCCH region.

In addition, it may be assumed that n number (e.g., 8) of REs per slot is allocated for transmitting 1 bit information of the non-adaptive HARQ indicator.

That is, the non-adaptive HARQ indicator may be transmitted through a PDSCH region in the similar way as the method that UL-SCH in a PUSCH region and HARQ ACK/NACK are multiplexed.

FIG. 32 shows examples of two cases that 16 REs are allocated for the non-adaptive HARQ indicator in a specific RB.

Particularly, FIG. 32a shows that the non-adaptive HARQ indicator is located in both side symbols that include the resource in which a common reference signal (CRS) is transmitted among the PDSCH region.

That is, the non-adaptive HARQ indicator may be transmitted through 4 REs in both sides of a CRS respectively (total 8 REs; 3210).

FIG. 32b shows that the non-adaptive HARQ indicator is located in a side symbol (left or right) that includes the resource in which a common reference signal (CRS) is transmitted among the PDSCH region.

That is, the non-adaptive HARQ indicator may be transmitted through 4 REs 3220 in a side of a CRS.

As shown in FIG. 32, RE(s) of the non-adaptive HARQ indicator are arranged in RE(s) except a predefined RS region, and accordingly, the non-adaptive HARQ indicator may be defined in various methods except as shown in FIG. 32a and FIG. 32b.

However, it may be preferable that a resource of the non-adaptive HARQ indicator is arranged (or positioned) with being adjacent to an RS region.

The reason is because a CRS may be located in different frequency region (i.e., a CRS may be transmitted in any position of symbol 0, 4, 7 or 11 between adjacent cells according to a cell ID. Accordingly, it is preferable that the RE for the non-adaptive HARQ indicator is allocated in regions (i.e., symbols 3, 5, 6, 8, 9, 10, 12 and 13) except the symbol in which a CRS is transmitted in order to minimize the interference between neighboring cells.

In addition, it is defined that DL-SCH data is not transmitted to the RE which is allocated for the non-adaptive HARQ indicator.

Furthermore, the resource region in which the non-adaptive HARQ indicator is transmitted may be received by a UE through a higher layer signaling (e.g., RRC/MAC) in semi-static manner or may be allocated through a DL grant transmitted in an initial data transmission in dynamic manner.

In addition, in the case that the non-adaptive HARQ indicator is transmitted in method 1-2, a UE detects the non-adaptive HARQ indicator preferentially for a retransmission data reception.

In the case that the non-adaptive HARQ indicator is set as '0', a UE determines that there is an error in HARQ feedback that the UE transmitted or the retransmission data is not transmitted to the corresponding region (previous DL grant resource), and stops the DL data reception.

In the case that the non-adaptive HARQ indicator is set as '1', a UE detects that it is the retransmission data for the HARQ feedback that the UE transmitted, and performs HARQ combining for the DL data previously which is received and the retransmission data.

In addition, in method 1-2, it may be preferable that the DL data to which the non-adaptive HARQ indicator is applied is defined and transmitted always.

That is, in the case that non-adaptive DL HARQ is used, the non-adaptive HARQ indicator may be used in the same way as the indicator indicating whether DL data received without a DL grant is retransmission data or new data.

The non-adaptive HARQ indicator may be transmitted in both cases of DL initial data transmission and retransmission data, but may be omitted in the case that a transmission of the non-adaptive HARQ indicator is not required in the initial data transmission.

In this case, the non-adaptive HARQ indicator is transmitted only in a retransmission data transmission.

Method 2: Non-Adaptive DL HARQ Method (For Asynchronous HARQ/Synchronous HARQ) Through a Simple DL Control Information Transmission.

Method 2 newly defines a simple DL grant including simple information instead of the existing DL grant, and represents a method of retransmitting DL data while minimizing overhead of DL control information transmission by transmitting a simple DL grant to a UE when retransmitting DL data.

Method 2 may be applied to both of the synchronous HARQ and the asynchronous HARQ for DL data.

The simple DL grant proposed in method 2 may be defined or designed as (1) a simple DL grant using down-level CCE of User-specific Search Space (USS) and (2) a new DCI format for a non-adaptive retransmission indicator through Common Search Space (CSS).

Method 2-1: Definition of Simple DL Grant Using Down-Level CCE of USS

Method 2-1 relates to a method that a simple DL grant is transmitted to the User-specific Search Space of a PDCCH.

Particularly, the DCI format for transmitting the simple DL grant includes information of smaller bits than that of the existing DL grant, and S_CCE that has a CCE unit of lower level than that of the existing CCE is newly defined for minimizing overhead for a control information transmission.

That is, as represented in Table 10 below, Simple (S)_CCE (PDCCH format 4) of a smaller unit than the exiting CCE unit is defined, and accordingly, a UE waiting for receiving retransmission data from an eNB is to perform blind decoding of S_CCE unit preferentially, thereby minimizing the overhead of the entire DL control information transmission.

TABLE 10

| PDCCH format | Number of CCEs | number of resource element groups | number of PDCCH bits |
| --- | --- | --- | --- |
| 4 | n/9 | n | 8 * n |
| 0 | 1 | 9 | 72 |
| 1 | 2 | 18 | 144 |
| 2 | 4 | 36 | 288 |
| 3 | 8 | 72 | 576 |

As defined in Table 10, S_CCE represents a unit of resource for a physical control information transmission that may be transmitted by using minimal signaling with CRC (e.g., 16 bits CRC for LTE).

The S_CCE may be defined as the number of n resource element groups according to information bits that a DL grant is available to transmit, and information bits of various lengths may be defined according to n. Herein, n may be an integer value greater than 0 and smaller than 9.

In addition, method 2-1 may define the simple DL grant that may be transmitted through S_CCE defined in Table 10 as shown in FIG. 33a and FIG. 33b, respectively.

FIG. 33 is a diagram illustrating an example of a simple DL grant format for non-adaptive DL HARQ proposed in the present disclosure.

That is, FIG. 33a shows an example of a simple DL grant format applied to the synchronous HARQ and FIG. 33b shows an example of a simple DL grant format applied to the asynchronous HARQ.

As shown in FIG. 33, in the case that DL HARQ is applied in the non-adaptive technique, a simple DL grant having short information length may be defined by omitting physical resource information (e.g., resource block assignment, MCS, TPC, etc.).

Particularly, as shown in FIG. 33a, in the case that the synchronous HARQ is also applied to DL HARQ, a simple DL grant of about 17 bits length that has 16 bits CRC 3310 and 1 bit information (NDI field; 3320) may be newly defined by omitting the HARQ related information (e.g., HARQ PID, RV, etc.) together as well as the resource information.

Here, the New Data Indicator (NDI) field may be used in the case that there is DL data that an eNB is needed to transmit urgently to a UE.

That is, using the NDI field, an eNB may transmit new data, not retransmission data, to a UE by using the corresponding retransmission resource, and may use the NDI for indicating that the corresponding data is initial transmission data (new data), not retransmission data.

However, in the case that such a DL data preemption technique (a method of transmitting urgent data by using a retransmission resource) is not used, an eNB may transmit a simple DL grant in which the NDI field is omitted but only CRC is included to a UE.

In this case, it is notified by using only a UE ID the fact that a data transmission in the corresponding TTI is retransmission data to which the non-adaptive HARQ is applied.

Or, it may also be defined that the simple DL grant includes 1 bit indicator and CRC that indicates the non-adaptive HARQ (or RDI, retransmission data indicator), instead of the NDI field.

FIG. 33b shows an example of a simple DL grant format for the case of applying the asynchronous HARQ for DL HARQ like the existing technique.

In this case, as shown in FIG. 33b, it is preferable that the HARQ related information (e.g., PID, RV) is transmitted with being included in a simple DL grant, and only the resource information (e.g., resource block assignment, MCS, TPC) in which retransmission data is transmitted may be omitted.

That is, as shown in FIG. 33b, it may be defined a simple DL grant of about 22 bits length including a PID field 3330, an RV field 3340, an NDI field 3320 and a CRC 3310.

Even in this case, as defined in the synchronous HARQ, instead of the NDI, a 1 bit indicator indicating the non-adaptive HARQ (or RDI, retransmission data indicator) is newly defined, and this may be transmitted together with the HAR related information.

Method 2-2: New DCI Format for a Non-Adaptive Retransmission Indicator Through Common Search Space (CSS)

Method 2-2 represents a method that a non-adaptive HARQ indicator is transmitted through common search space of a PDCCH.

That is, method 2-2 relates to a method that the control information (e.g., non-adaptive HARQ indicator) for the data retransmitted in the non-adaptive technique is transmitted through the common search space.

In addition, the new control information proposed in method 2-2 may be defined as a collection (or aggregation or set) including only the indicators indicating whether data transmitted in a specific resource is retransmission data due to the non-adaptive HARQ or not.

The collection (or aggregation or set) including only the indicators may be designed by newly defining a DCI format.

Here, the indicator may be represented as a non-adaptive HARQ indicator, a retransmission data indicator, or the like and the total length of the new control information that corresponds to the collection of the indicators may be defined as a value which is mapped by specific DL resource information.

That is, a new DCI format including the indicator or a collection of the indicators proposed in method 2-2 may be configured in the similar way as existing DCI format 3/3A as shown in FIG. 34.

FIG. 34 is a diagram illustrating another example of a simple DL grant format for non-adaptive DL HARQ proposed in the present disclosure.

As shown in FIG. 34, a new DCI format may include retransmission data indicator information for a physical resource index (PRB; FIG. 34a or PBG; FIG. 34b).

FIG. 34a shows a new DCI format including a non-adaptive retransmission indicator 3410 of a PRB index unit and FIG. 34b shows a new DCI format including a non-adaptive retransmission indicator 3420 of a PBG index unit.

As exemplified in FIG. 34, the new DCI format may be represented as DCI format 3X.

Here, the RBG means a Resource Block Group, and it may be preconfigured on how many RB bundles are determined as a single RBG size according to the RB number for system bandwidth.

For example, in the case of LTE(-A), 1 RBG=1 RB for the system bandwidth having 10 or less RBs, 1 RBG=2 RBs for the system bandwidth having 11 to 26 RBs, and 1 RBG=4 RBs for the system bandwidth having 64 to 110 RBs.

As shown in FIG. 34, the new DCI format (e.g., DCI format 3X) transmitted in the CSS region may have a length as much as the physical resource index size for DL resource region.

In the case that DL HARQ operates in the synchronous technique, a UE may know whether the data corresponding to a specific PID is retransmission data or not with only the simple DL grant defined in FIG. 34.

At this time, in the case that the resource allocated to the UE is allocated as one or more PRBs or a bundle of RBG, the UE may identify an indicator by referring to the lowest physical resource index value only that was allocated to the UE itself.

However, in the case that DL HARQ operates in the asynchronous HARQ technique, and when the (non-adaptive retransmission) indicator for a specific physical resource index is set as '1' (data for a specific PID represents retransmission data), the UE may transmit the PID for the corresponding data together with the indicator in the new DCI format.

For this, an eNB may transmit an additional information region (M bits) for transmitting the PID corresponding to an indicator which is set as '1' behind an indicator(s) field sequentially with being included in the new DCI format to the UE.

That is, FIG. 35 is a diagram illustrating another example of a simple DL grant format for non-adaptive DL HARQ or a new DCI format proposed in the present disclosure.

FIG. 35a shows a new DCI format including a non-adaptive retransmission indicator of PRB index unit, and FIG. 35b shows a new DCI format including a non-adaptive retransmission indicator of RBG index unit.

As shown in FIG. 35, when an indicator for a physical resource index is set as '1', a new DCI format may be transmitted with a PID being additionally included in an order of indicators that are set as '1'

That is, the number of total PIDs transmitted through the new DCI format is the same as the number of indicators set as '1' among the indicators for N number of physical resource indexes.

Accordingly, a UE may know the size of additional information region 3510 in the new DCI format through the new DCI format (e.g., DCI format 3X), and may perform blind decoding of the new DCI format.

Method 2-3: Definition of New Physical Channel (e.g., PRICH: Physical Retransmission Indicator CHannel)

Method 2-3 represents a method for performing the non-adaptive DL HARQ operation proposed in the present disclosure by defining a new physical channel in a PDCCH region.

Hereinafter, the new physical channel is represented as 'physical retransmission indicator channel (PRICH)', for the convenience of description.

The PRICH is a new physical DL channel for transmitting a retransmission indicator that indicates whether to retransmit non-adaptive DL data.

That is, the PRICH means a channel for transmitting and receiving the non-adaptive retransmission indicator of 1 bit.

In the case that a UE receives a retransmission indicator set as '1' in a resource in which retransmission data for the previously received data from an eNB (through a PRICH), the UE detects that the DL data transmitted in the corresponding resource region is the retransmission data for the previous data that the UE itself should receive.

That is, the UE receives the resource information for the retransmission data from the eNB by using the DL grant information received for initial data without any DL grant in the corresponding III.

The PRICH may be defined in the similar way of the PHICH defined in LTE(-A).

That is, the PRICH may be defined so as to transmit an (retransmission) indicator of 1 bit by using n number of RE(s).

Here, n may be a value which is determined as an optimal value according to spreading or repetition count.

For example, it may be defined that the indicator of 1 bit is transmitted by using a PRICH through 12 REs by using 4 spreading * 3 repetition as the same as a PHICH.

In this case, in order for a UE to know a position of the indicator for data that the UE itself receives through a PRICH, it may be configured or defined that the resource of each indicator on a PRICH is mapped to the lowest PRB index of DL retransmission data.

That is, in the existing PHICH, whereas the PHICH resource is mapped by the lowest PRB index and DMRS cyclic shift (CS) value of UL data, the PRICH proposed in method 2-3 may define such that a PRICH resource is mapped by the lowest PRB index and/or DL antenna port value (layer) of DL retransmission data.

In the case that an eNB transmits one or more DL data to a UE in the same resource region each indicator for the corresponding DL data should be transmitted through different PRICH resources with each other.

Accordingly, mapping of the PRICH resource uses an antenna port value or DMRS sequence such that each indicator may be transmitted through different PRICH resources with each other.

That is, different $n_{LAYER}$ value is allocated to a specific lowest PRB index (PRB index in which PRICH resource collision may occur), and accordingly, a resource is mapped to different PRICH group. Here, $n_{LAYER}$ may have a value of 0 to 7.

Accordingly, the eNB may designate a logical antenna port value to a specific index among 0 to 7, and each indicator is mapped to different PRICH resource by using it.

The index pair ($n_{PHICH}^{group}$, $h_{PRICH}^{seq}$) for a PRICH resource may be defined as Equations 7 and 8.

$$n_{PRICH}^{group} = (I_{PRB\_RA} + n_{LAYER}) \bmod N_{PRICH}^{group} + I_{PRICH} N_{PRICH}^{group}$$ [Equation 7]

$$n_{PRICH}^{seq} = (\lfloor I_{PRB\_RA} / N_{PRICH}^{group} \rfloor + n_{LAYER}) \bmod 2N_{SF}^{PRICH}$$ [Equation 8]

$n_{PRICH}^{group}$: This term represents the number of PRICH group configured by a higher layer $n_{PRICH}^{seq}$: This term represents an orthogonal sequence index in $n_{PRICH}^{group}$ $n_{LAYER}$: This term represents an antenna port (value)

$N_{SF}^{PRICH}$: =4 (Normal Cyclic prefix) or 2 (extended cyclic prefix)

$I_{PRB\_RA}$ is the same as $I_{PRB\_RA}^{lowest\_index}$ in the case that the number of transport blocks manually detected is not the same as the number of transport blocks indicated the latest PDCCH in relation to the corresponding PDSCH, when it the first transport block of the PDSCH in relation to the PDCCH or there is not related PDCCH.

On the other hand, $I_{PRB\_RA}$ is the same as $I_{PRB\_RA}^{lowest\_index}+1$, in the case that it is the second transport block of the PDSCH in relation to the PDCCH. Here, $I_{PRB\_RA}^{lowest\_index}$ corresponds to the lowest PRB index of the first slot of the corresponding PDSCH transmission.

$I_{PRICH}$ has a value '1' when a PDSCH is transmitted subframe index 4 or 9 in UL-DL configuration 0, and has a value '0' otherwise.

Table 11 below represents an example of orthogonal sequences [w(0), . . . , w($N_{SF}^{PRICH}$-1] for a PRICH.

TABLE 11

| Sequence index $n_{PRICH}^{seq}$ | Orthogonal sequence | |
|---|---|---|
| | Normal cyclic prefix $N_{SF}^{PRICH} = 4$ | Extended cyclic prefix $N_{SF}^{PRICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

TABLE 12

| HI | HI codeword <b0, b1, b2> |
|---|---|
| 0 (adaptive HARQ) | <0, 0, 0> |
| 1 (non-adaptive HARQ) | <1, 1, 1> |

As described in Equations 7 and 8, Table 11 and Table 12, when a PRICH resource is set, a UE checks a PRICH first for receiving DL retransmission data.

Later, the UE receives retransmission data immediately through retransmission resource region, and performs HARQ combining for the received retransmission data and the previous data.

As described above, in the case that a resource position for receiving the retransmission data is changed by frequency hopping/shift pattern, by mapping a PRICH resource with respect to the lowest PRB index for the resource region changed according to a pattern, the UE may identify the non-adaptive retransmission indicator for the retransmission data.

The non-adaptive retransmission indicator using a PRICH may be applied when the synchronous HARQ is performed for DL data.

In order to apply the non-adaptive retransmission indicator in the case that the asynchronous HARQ is performed for DL data, the information indicating a HARQ process ID (PID) should be transmitted together with the non-adaptive retransmission indicator.

As described in method 2-3, in the case that a PRICH channel for transmitting and receiving the non-adaptive retransmission indicator is newly defined, the resource information (e.g., $N_{PRICH}^{group}$, $N_{SF}^{PRICH}$) for the PRICH channel may be transmitted to the UE through system information, and the like.

In this case, the system information including the resource information for the PRICH channel may be transmitted by using a system information message which is transmitted to short TTI or 5G UE.

The resource information for the PRICH channel may be defined as a PRICH-Config Information Element (IE), and Table 13 and Table 14 below represent an example of the PRICH-Config IE format.

The PRICH-Config information element may be transmitted through MIB or SIB-n, which is one of system information blocks.

TABLE 13

<PRICH-Config information element>

-- ASN1START
PRICH-Config ::=          SEQUENCE {
    prich-Duration        ENUMERATED {normal, extended},
    prich-Resource        ENUMERATED {oneSixth, half, one, two}
}
-- ASN1STOP

TABLE 14

PRICH-Config field descriptions prich-Duration
Parameter: PRICH-Duration, $N_{SF}^{PRICH}$, Value Normal corresponds to 4, extended corresponds to 2
(Parameter: PRICH period, generally, $N_{SF}^{PRICH}$ value correpsonds to 4 in normal CP and corresponds to 2 in extended CP.)
prich-Resource
Parameter: Ng, $N_{PRICH}^{group}$. Value oneSixth corresponds to ⅙, half corresponds to ½ and so on.
(Parameter: Ng, $N_{PRICH}^{group}$. oneSixth value corresponds to ⅙, and half value corresponds to ½.)

As another embodiment, a method for applying a PRICH in the legacy TTI is described.

In order to apply the PRICH proposed in method 2-3 in the legacy TTI, the corresponding retransmission indicators should be transmitted without influencing a legacy UE.

For this, in another embodiment, by using (or extending) the existing PHICH resource region, a method for transmitting and receiving the non-adaptive retransmission indicator is proposed.

In this case, a size of the PHICH resource region may be set to have greater resource region size than previous case by considering the number of DL data that is available to be transmitted in the non-adaptive DL HARQ technique.

For this, for the PHICH-Resource in the PHICH-Config, except the oneSixth, half, one and two, a value for greater size may be additionally configured.

As such, in order to transmit the non-adaptive DL data retransmission indicator together with HARQ ACK/NACK through an extension of the existing PHICH region, the lowest PRB index value of DL data may be modified to a value to which UL RB number ($N_{UL}^{RB}$) is added.

That is, an index pair ($n_{PRICH}^{group}$, $n_{PRICH}^{seq}$) for the modified PHICH resource may be configured such that a PHICH resource for UL data is not mapped to the same lowest PRB index by adding UL RB number ($N_{UL}^{RB}$) to $I_{PRB\_RA}$ with respect to the lowest PRB index.

That is, the modified $I_{PRB\_RA}$ may be defined as Equation 9 below.

$$I_{PRB\_RA} = \begin{cases} I_{PRB\_RA}^{lowest\_index} + N_{RB}^{UL} \\ I_{PRB\_RA}^{lowest\_index} + N_{RB}^{UL} + 1 \end{cases}$$ [Equation 9]

In summary, it is defined that the existing DL data transmission should be transmitted together with a DL grant.

In LTE Rel-8, a DL grant may have information of 19 to 38 bits length (for RA type 0) depending on a system bandwidth, and CRC of 16 bits is added, and accordingly, 35 to 54 bits are required for the entire length of a DL grant.

In addition, the coded bits generated according to an MCS level is designed such that 72 to 576 bits information is able to be transmitted as defined in the number of PDCCH bits field in Table 16 below.

That is, when the conventional art is used, minimum 1 CCE, that is, 36 REs resources are wasted for a single retransmission data. In the case that n retransmission data are existed in a single TTI, resources of 36*n REs are used.

Table 15 below represents a transport bandwidth configuration $N_{RB}$ in E-UTRA channel bandwidths.

TABLE 15

| Channel bandwidth BWChannel [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |
| Transmission bandwidth configuration NRBG | 6 | 8 | 13 | 17 | 19 | 25 |

Table 16 below represents an example of resource information for 1, 2, 4 and 8 CCEs defined in LTE(-A).

TABLE 16

| PDCCH format | Number of CCEs | number of resource element groups | number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

That is, when the methods proposed in the present disclosure is used, overhead for transmitting DL control information may be decreased in comparison with the conventional art.

In the case that a DL grant is omitted as described in method 1-1, the resource waste of a PDCCH may not occur any more.

In the case that a retransmission indicator is multiplexed with DL-SCH data in a PDSCH as described in method 1-2, 12 REs are used in a data resource. However, since control channel resource is never used, the signaling overhead for a control channel does not occur.

In addition, as described in method 2-1, by defining that 1 to 6 bits information is transmitted by using the simple DL grant and through the S_CCE configured as minimum 12 REs to 24 REs for a single retransmission data, resources of about 2 to 3 times may be saved in comparison with the conventional art.

In the case of method 2-2, without regard to the number of retransmission data, a fixed size of signaling overhead may occur according to the number of REGs or RBs.

Here, assuming that ⅓ coding rate is applied by considering the common search space and a retransmission indicator is transmitted for an REG, it may be identified that 36 REs to 144 REs are used depending on a system bandwidth.

This means that a retransmission for 1 to 3 REGs may occur depending on a system bandwidth when it is assumed that data of average 10% are retransmitted in the conventional art. In the case that ⅓ coding rate is required in the same way, when 1 to 3 retransmission data are transmitted, 72 REs to 216 REs are required, and accordingly, there is an effect of decreasing overhead as much as two times as previously.

In the case of method 2-3, 12 REs are required for transmitting a single retransmission indicator. However, maximum 8 indicators may be distinguished using the same resource, 1 to 3 retransmission data may occur when it is assumed that retransmission of 10% data may occur in average, and in this case, the corresponding information may be transmitted through 12 REs.

As described above, Table 17 below represents overheads for DL control information transmission in the methods proposed in the conventional art and the present disclosure.

TABLE 17

|  |  | Conventional Art | Method 1-1 | Method 1-2 | Method 2-1 | Method 2-2 (⅓ coding rate, REG) | Method 2-3 (n < 4) |
|---|---|---|---|---|---|---|---|
| Control information resource size (REs) | asynchronous HARQ | 36 * n or 72 * n | — | — | 12 * n | 72~144 | — |
| | synchronous HARQ | — | 0 | 12 * n | 24 * n | 36~72 | 12 |

General Apparatus to which the Present Invention May be Applied

FIG. 36 illustrates a block diagram of a wireless communication apparatus to which the methods proposed in the present disclosure may be applied.

Referring to FIG. 36, a wireless communication system includes a base station (eNB) 3610 and a plurality of user equipments (UEs) 3620 located within the region of the eNB 3610.

The eNB 3610 includes a processor 3611, a memory 3612 and a radio frequency (RF) unit 3613. The processor 3611 implements the functions, processes and/or methods proposed in FIGS. 1 to 35 above. The layers of wireless interface protocol may be implemented by the processor 3611. The memory 3612 is connected to the processor 3611, and stores various types of information for driving the processor 3611. The RF unit 3613 is connected to the processor 3611, and transmits and/or receives radio signals.

The UE 3620 includes a processor 3621, a memory 3622 and an RF unit 3623. The processor 3621 implements the functions, processes and/or methods proposed in FIGS. 1 to 35 above. The layers of wireless interface protocol may be implemented by the processor 3621. The memory 3622 is connected to the processor 3621, and stores various types of information for driving the processor 3621. The RF unit 3623 is connected to the processor 3621, and transmits and/or receives radio signals.

The memories 3612 and 3622 may be located interior or exterior of the processors 3611 and 3621, and may be connected to the processors 3611 and 3621 with well known means.

In addition, the eNB 3610 and/or the UE 3620 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for transmitting and receiving DL data in a wireless communication system of the present invention has been described mainly with the example applied to 3GPP LTE/LTE-A system, but may also be applied to various wireless communication systems except the 3GPP LTE/LTE-A system.

The invention claimed is:
1. A method for transmitting and receiving a downlink (DL) data in a wireless communication system, the method performed by a user equipment (UE) comprising:
    receiving a first DL grant from a base station (BS);
    receiving, from the BS, a first DL data based on the first DL grant;
    transmitting, to the BS, a HARQ response in response to the first DL data; and
    receiving a second DL data from the BS,
    wherein the first DL data and the second DL data are received through a frequency region allocated by the first DL grant,
    wherein a specific frequency shift pattern in the frequency region is configured in a frequency region i) between a resource in which the second DL data is received and a resource in which the first DL data is received, or ii) between resources in which the second DL data is received, and wherein a Physical Resource Block (PRB) index sequence of a DL data is shifted from a PRB index sequence of a previous DL data, based on a shift value configured by the specific frequency shift pattern.

2. The method of claim 1, wherein the first DL data is initial DL data, and wherein the second DL data is retransmission data for the first DL data.

3. The method of claim 1, wherein the second DL data is received in a frequency shifted resource as much as a predetermined value from the resource in which the first DL data is received or from the resource in which the second DL data is received in a frequency region.

4. The method of claim 1, wherein the specific frequency shift pattern is determined by Equation below, $$\text{Lowest } PRB \text{ index}_{(i+1)^{th}{}_{data}} = (\text{Lowest } PRB \text{ index}_{i^{th}{}_{data}} + \text{shift}_n) \% N_{RB}$$

herein, i represents an integer value satisfying condition 1≤i≤n, n represents a maximum HARQ retransmission count, i=1 represents an initial data transmission, $\text{shift}_n$ represents an integer value satisfying the condition $0 \leq \text{shift}_n \leq N_{RB}-1$, $N_{RB}$ represents an RB number that is available to be set depending on a bandwidth, and % represents a modulo operation symbol.

5. The method of claim 1, wherein the second DL data is received from the BS after a predetermined time from the time when the HARQ response is transmitted.

6. The method of claim 1, further comprising receiving a retransmission indicator indicating that the second DL data is data which is retransmitted without a DL grant in relation to a reception of the second DL data.

7. The method of claim 6, wherein the retransmission indicator is received from the BS by being multiplexed with the second DL data in a physical downlink shared channel (PDSCH) resource region.

8. The method of claim 7, wherein the retransmission indicator is allocated in a unit of resource element (RE) or in a unit of resource block (RB) in the PDSCH resource region.

9. The method of claim 7, wherein the retransmission indicator is allocated in a resource except the resource allocated for a reference signal (RS) or DL data.

10. The method of claim 9, wherein the retransmission indicator is allocated in both symbols of a symbol allocated for the reference signal or allocated in any one side symbol of a symbol allocated for the reference signal.

11. The method of claim 6, further comprising receiving control information in relation to a resource position to which the retransmission indicator is allocated, wherein the control information is received through a radio resource control (RRC) message, a MAC message or a DL grant.

12. The method of claim 6, further comprising determining whether to perform hybrid automatic repeat request (HARQ) combining of the first DL data and the second DL data based on the received retransmission indicator.

13. The method of claim 6, wherein the retransmission indicator is received through a Physical Retransmission Indicator Channel (PRICH), and wherein a resource of the PRICH is mapped by at least one of a lowest PRB index of the second DL data or a DL antenna port layer.

14. The method of claim 1, further comprising receiving a simple DL grant including resource information in relation to a reception of the second DL data from the BS.

15. The method of claim 14, wherein the simple DL grant is received through a UE-specific Search Space (USS) of a Physical Downlink Control Channel (PDCCH), and wherein the simple DL grant is received in a unit of simple Control Channel Elements (CCEs).

16. The method of claim 15, wherein the simple DL grant includes at least one of a cyclic redundancy check (CRC) field or a New Data Indicator (NDI) field, when synchronous hybrid automatic repeat request (HARQ) is applied.

17. The method of claim 16, wherein the NDI field is information indicating whether the received DL data is retransmission data or new data.

18. The method of claim 15, wherein the simple DL grant includes at least one of a cyclic redundancy check (CRC) field, a New Data Indicator (NDI) field or a hybrid automatic repeat request (HARQ) related field, when asynchronous HARQ is applied.

19. The method of claim 14, wherein the simple DL grant is received through a Common Search Space (CSS) of a physical downlink control channel (PDCCH), wherein the simple DL grant includes at least one retransmission indicator only, wherein the retransmission indicator is information indicating that the second DL data is data retransmitted without a DL grant in relation to a reception of the second DL data, and wherein the simple DL grant further includes a process ID (PID) field indicating a HARQ PID for the second DL data when the retransmission indicator is set as a value indicating retransmission data.

20. A user equipment (UE) for transmitting and receiving a downlink (DL) data in a wireless communication system, comprising:

a radio frequency (RF) transceiver for transmitting and receiving a radio signal; and a processor functionally connected to the RF transceiver, wherein the processor is configured to:

receive a first DL grant from a base station (BS);

receive, from the BS, a first DL data based on the first DL grant;

transmit, to the BS, a hybrid automatic repeat request (HARQ) response in response to the first DL data; and receive a second DL data from the BS, wherein the processor is configured to receive the first DL data and the second DL data through a frequency region allocated by the first DL grant, wherein a specific frequency shift pattern in the frequency region is configured i) between a resource in which the second DL data is received and a resource in which the first DL data is received, or ii) between resources in which the second DL data is received, and wherein a Physical Resource Block (PRB) index sequence of a DL data is shifted from a PRB index sequence of a previous DL data, based on a shift value configured by the specific frequency shift pattern.

* * * * *